United States Patent
Ishihara et al.

(10) Patent No.: US 9,534,122 B2
(45) Date of Patent: Jan. 3, 2017

(54) OLIGOMER-MODIFIED FINE PARTICLES, METHOD FOR PRODUCING THE SAME, AND COATING CONTAINING THE PARTICLES

(71) Applicant: JGC Catalysts and Chemicals Ltd., Kawasaki (JP)

(72) Inventors: Yoichi Ishihara, Kitakyushu (JP); Toshiharu Hirai, Kitakyusyu (JP)

(73) Assignee: JGC Catalysts and Chemicals Ltd., Kawasaki-shi (KR)

(*) Notice: Subject to any disclaimer, the term of this patent is extended or adjusted under 35 U.S.C. 154(b) by 0 days.

(21) Appl. No.: 14/366,937

(22) PCT Filed: Dec. 21, 2012

(86) PCT No.: PCT/JP2012/083277
§ 371 (c)(1),
(2) Date: Jun. 19, 2014

(87) PCT Pub. No.: WO2013/094738
PCT Pub. Date: Jun. 27, 2013

(65) Prior Publication Data
US 2014/0316046 A1 Oct. 23, 2014

(30) Foreign Application Priority Data
Dec. 21, 2011 (JP) ................. 2011-279897

(51) Int. Cl.
| C09D 7/12 | (2006.01) |
| C09C 1/36 | (2006.01) |
| C09C 1/40 | (2006.01) |
| C09C 3/10 | (2006.01) |
| C09C 3/12 | (2006.01) |
| C09D 17/00 | (2006.01) |
| C09C 1/00 | (2006.01) |
| C09C 1/02 | (2006.01) |
| C09D 201/00 | (2006.01) |
| C09C 3/06 | (2006.01) |
| C09C 3/00 | (2006.01) |
| C09C 3/04 | (2006.01) |
| C08K 9/06 | (2006.01) |

(52) U.S. Cl.
CPC ............ *C09D 7/1225* (2013.01); *C09C 1/00* (2013.01); *C09C 1/0096* (2013.01); *C09C 1/02* (2013.01); *C09C 1/36* (2013.01); *C09C 1/3607* (2013.01); *C09C 1/3623* (2013.01); *C09C 1/3676* (2013.01); *C09C 1/3684* (2013.01); *C09C 1/3692* (2013.01); *C09C 1/40* (2013.01); *C09C 3/006* (2013.01); *C09C 3/041* (2013.01); *C09C 3/063* (2013.01); *C09C 3/10* (2013.01); *C09C 3/12* (2013.01); *C09D 7/12* (2013.01); *C09D 17/00* (2013.01); *C09D 201/00* (2013.01); *C01P 2006/22* (2013.01); *C08K 9/06* (2013.01); *Y10T 428/2982* (2015.01)

(58) Field of Classification Search
None
See application file for complete search history.

(56) References Cited

U.S. PATENT DOCUMENTS

| 5,001,183 A * | 3/1991 | Sands .................... B82Y 30/00 |
| | | 106/490 |
| 5,322,888 A | 6/1994 | Kato et al. |
| 5,543,173 A | 8/1996 | Horn, Jr. et al. |
| 5,733,644 A | 3/1998 | Tanaka et al. |
| 6,380,301 B1 * | 4/2002 | Enami et al. ................ 524/588 |
| 6,482,411 B1 | 11/2002 | Ahuja et al. |
| 7,641,972 B2 * | 1/2010 | Nolte .................... B82Y 30/00 |
| | | 427/212 |
| 2007/0207176 A1 | 9/2007 | Kamei et al. |
| 2011/0005803 A1 * | 1/2011 | Yanagisawa ........... 174/110 AR |
| 2012/0132108 A1 | 5/2012 | Ishihara et al. |

FOREIGN PATENT DOCUMENTS

| JP | 01-126375 | 5/1989 |
| JP | 05-002102 | 1/1993 |
| JP | 7-76671 | 3/1995 |
| JP | 07-196946 | 8/1995 |
| JP | 7-331112 | 12/1995 |
| JP | 08-157771 | 6/1996 |
| JP | 2000-204301 | 7/2000 |
| JP | 2004-059476 | 2/2004 |
| JP | 2005-344020 | 12/2005 |
| JP | 2007-016111 | 1/2007 |
| JP | 2007-238645 | 9/2007 |
| JP | 2009-292915 | 12/2009 |
| JP | 2011-21192 | 2/2011 |
| JP | 2011-37659 | 2/2011 |
| JP | 2011-132484 | 7/2011 |
| JP | 2011-148946 | * 8/2011 |

OTHER PUBLICATIONS

"Hydrolysis and Condensation of Silicates: Effects on Structure" authored by Brinker and published in the Journal of Non-Crystalline Solids (1988) 100, 31-50.*
Machine-generated translation for JP 2011-148946 (no date).*
Abstract for JP 2011-148946 (no date).*

* cited by examiner

Primary Examiner — Marc Zimmer
(74) Attorney, Agent, or Firm — The Webb Law Firm

(57) ABSTRACT

Provided are surface-treated fine particles which, when added to coatings for the production of films, exhibit excellent reactivity with respect to organosilicon compounds and resins that are matrix components of the coating films, and thereby allow the films to exhibit excellent performance. Oligomer-modified fine particles include inorganic oxide fine particles having a surface modified with an oligomer, the oligomer being derived from a metal alkoxide represented by Formula (1): $R_nM_1(OR')_{z-n}$ (1) wherein $M_1$: one or more elements selected from Si, Ti, Zr and Al; R and R': one or more groups selected from alkyl groups of 1 to 8 carbon atoms, aryl groups and vinyl groups; n: an integer of from 0 to (z−2); and z: the valence of $M_1$. The oligomer has a polymerization degree of 3 or more. The oligomer has a weight average molecular weight in the range of 1000 to 10000.

19 Claims, No Drawings

OLIGOMER-MODIFIED FINE PARTICLES, METHOD FOR PRODUCING THE SAME, AND COATING CONTAINING THE PARTICLES

CROSS-REFERENCE TO RELATED APPLICATIONS

This application is the United States national phase of International Application No. PCT/JP2012/083277 filed Dec. 21, 2012, and claims priority to Japanese Patent Application No. 2011-279897 filed Dec. 21, 2011, the disclosures of which are hereby incorporated in their entirety by reference.

TECHNICAL FIELD

The present invention relates to oligomer-modified particles, methods for producing the same, and coatings containing the fine particles.

BACKGROUND ART

High abrasion resistance is among the performances of films desired in the field of coating films containing organosilicon compounds and resins as matrixes.

In particular, films are required to perform well in both abrasion resistance and other properties such as refractive index and transparency in the field of hardcoat films and primer films that protect the surface of optical substrates such as spectacle lenses.

A known approach to improving the refractive index and the abrasion resistance of such films is to add metal oxide particles to film-forming coatings.

For example, JP-A-H05-002102 describes hardcoat films that are composed of a matrix and composite oxide particles including an iron oxide component and a titanium oxide component. According to the disclosure, such films exhibit high refractive index, transparency and abrasion resistance.

However, composite oxide particles show low reactivity with respect to a matrix component. This problem is addressed by treating the surface of the particles with a silane-coupling agent to enhance the reactivity with respect to matrixes.

For example, JP-A-H07-076671 describes a coating composition for optical plastic shaped articles containing titanium oxide composite fine particles whose surface has been modified with a silane-coupling agent.

However, there has been a demand for a further improvement of these surface modification treatment methods in order to enhance film performance.

Patent Literature 1: JP-A-H05-002102
Patent Literature 2: JP-A-H07-076671

The present invention aims to solve the conventional problems mentioned above. It is therefore an object of the invention to provide surface-treated fine particles which have excellent reactivity with respect to a matrix component and allow films to exhibit excellent coating performance.

SUMMARY OF THE INVENTION

The present inventors carried out extensive studies and have found that the object of the invention may be achieved according to the configurations described below, thus completing the invention. That is, the present invention resides in the following.

[1] Oligomer-modified inorganic oxide fine particles that are oligomer-modified fine particles including inorganic oxide fine particles having a surface modified with an oligomer, the oligomer being derived from a metal alkoxide (or a mixture of metal alkoxides having different $M_1$, R, R' and n) represented by Formula (1):

$$R_n M_1 (OR')_{z-n} \quad (1)$$

wherein $M_1$: one or more elements selected from Si, Ti, Zr and Al;

R and R': one or more groups selected from alkyl groups of 1 to 8 carbon atoms, aryl groups and vinyl groups;

n: an integer of from 0 to (z−2); and z: the valence of $M_1$;

the oligomer having a polymerization degree of 3 or more, the oligomer having a weight average molecular weight in the range of 1000 to 10000.

[2] The oligomer-modified inorganic oxide fine particles described in [1], wherein the oligomer is a polycondensate of a hydrolyzate and/or a partial hydrolyzate of the metal alkoxide, or a mixture of the polymers.

[3] The oligomer-modified inorganic oxide fine particles described in [1] or [2], wherein $M_1$ is Si.

[4] The oligomer-modified inorganic oxide fine particles described in any of [1] to [3], wherein the inorganic oxide fine particles are oxide fine particles or composite oxide fine particles including one or more metal elements selected from titanium, zirconium, tin, niobium, tungsten, antimony, indium and aluminum.

[5] The oligomer-modified inorganic oxide fine particles described in any of [1] to [4], which have a unit viscosity in the range of 0.07 to 0.65 mPa·s/(wt %), the unit viscosity being obtained by dividing the viscosity of a methanol dispersion of the oligomer-modified inorganic oxide fine particles in methanol by the solid concentration of the dispersion.

[6] The oligomer-modified inorganic oxide fine particles described in any of [1] to [5], wherein the weight (A) of modification by the oligomer has a ratio to the weight (B) of the inorganic oxide fine particles in the range of (A)/(B)= 0.05 to 5.0.

[7] The oligomer-modified inorganic oxide fine particles described in any of [1] to [6], wherein the oligomer-modified inorganic oxide fine particles have an average particle diameter in the range of 9 to 65 nm.

[8] A dispersion including the oligomer-modified inorganic oxide fine particles described in any of [1] to [7].

[9] A coating including the oligomer-modified inorganic oxide fine particles described in any of [1] to [7] or the dispersion described in [8], and a matrix component.

[10] A method for producing oligomer-modified inorganic oxide fine particles having a surface modified with an oligomer, the method including the following Steps (1) and (2):

Step (1)

an acid catalyst and water are added to a metal alkoxide (or a mixture of metal alkoxides having different $M_1$, R, R' and n) and/or a hydrolyzate thereof, the metal alkoxide being represented by Formula (1):

$$R_n M_1 (OR')_{z-n} \quad (1)$$

wherein $M_1$: one or more elements selected from Si, Ti, Zr and Al;

R and R': one or more groups selected from alkyl groups of 1 to 8 carbon atoms, aryl groups and vinyl groups;

n: an integer of from 0 to (z−2); and z: the valence of $M_1$; and the resultant mixture solution is subjected to hydrolysis and polycondensation at 60 to 120° C. for 20 minutes to 24 hours to form a mixture solution including a linear metal alkoxide oligomer;

Step (2)

the acid catalyst is removed from the mixture solution including the linear metal alkoxide oligomer produced in Step (1), inorganic oxide fine particles including one or more metal elements selected from titanium, zirconium, tin, niobium, tungsten, antimony, indium and aluminum are added to the mixture solution, and the resultant mixture is treated at 5 to 30° C. for 0.5 to 24 hours to allow the metal alkoxide oligomer to react with the surface of the inorganic oxide fine particles.

[11] The method for producing oligomer-modified inorganic oxide fine particles described in [10], wherein the hydrolysis of the metal alkoxide in Step (1) takes place with a pH of the mixture solution in the range of 2 to 4.

The oligomer-modified inorganic oxide fine particles of the invention are modified with an oligomer having a prescribed polymerization degree and a prescribed molecular weight. By virtue of this configuration, coatings containing the fine particles can give films that achieve enhanced abrasion resistance and film hardness and exhibit excellent adhesion and transparency. Further, coating films excellent in light resistance, weather resistance, chemical resistance and moisture resistance can also be provided.

DETAILED DESCRIPTION OF THE INVENTION

Oligomer-Modified Inorganic Oxide Fine Particles

Oligomer-modified inorganic oxide fine particles of the present invention are oligomer-modified fine particles that include inorganic oxide fine particles having a surface modified with an oligomer. The oligomer is derived from a metal alkoxide (or a mixture of metal alkoxides having different $M_1$, R, R' and n) represented by Formula (1):

$$R_nM_1(OR')_{z-n} \quad (1)$$

wherein $M_1$: one or more elements selected from Si, Ti, Zr and Al;

R and R': one or more groups selected from alkyl groups of 1 to 8 carbon atoms, aryl groups and vinyl groups;

n: an integer of from 0 to (z−2); and z: the valence of $M_1$. The oligomer has a polymerization degree of 3 or more. The oligomer has a weight average molecular weight in the range of 1000 to 10000.

The oligomers are derived from the metal alkoxide, and may include a polycondensate of a hydrolyzate and/or a partial hydrolyzate of the metal alkoxide, or may include a further polycondensate of the polycondensate, or a mixture of these polymers.

Due to the surface of the particles being modified with the above oligomer, coatings containing the fine particles can give films that achieve improvements in film hardness, adhesion, abrasion resistance and transparency.

Preferably, the oligomers include an oligomer that is a linear polycondensate. The oligomer-modified inorganic oxide fine particles modified with such oligomers advantageously exhibit high stability in organic solvents and high reactivity with a matrix component, and also give films having excellent hardness and abrasion resistance. Further, such oligomer-modified inorganic oxide fine particles are advantageous in that the oligomer on the surface of the oligomer-modified inorganic oxide fine particles bonds to a matrix component during the formation of films and these components become combined together to achieve higher resistance to defects such as film cracks as compared to when fine particles are treated with a usual silane-coupling agent. Furthermore, the oligomers associated with the invention have a larger number of OH groups per molecule as compared to usual silane-coupling agents used in the treatment of fine particles with silane-coupling agents. This fact provides an advantage that a relatively small amount of modification achieves the same levels of hardness and abrasion resistance as those obtained with the silane-coupling agents.

The polymerization degree of the oligomers is advantageously not less than 3, more preferably 6 to 100, and still more preferably 15 to 90. Any polymerization degree less than 3 disadvantageously causes a decrease in the hardness of films.

The weight average molecular weight of the oligomers is advantageously in the range of 1000 to 10000, and more preferably 3000 to 9000. If the weight average molecular weight is less than 1000, the hardness of films is disadvantageously decreased. Any weight average molecular weight exceeding 10000 disadvantageously causes a decrease in the abrasion resistance of films.

The letter $M_1$ in Formula (1): $R_nM_1(OR')_{z-n}$ advantageously includes one or more elements selected from Si, Ti, Zr and Al. The use of metal alkoxides containing such elements is advantageous in that films containing the oligomer-modified inorganic oxide fine particles achieve enhanced refractive index, film hardness and abrasion resistance.

It is more preferable that $M_1$ be Si.

In Formula (1): $R_nM_1(OR')_{z-n}$, R and R' are each advantageously one or more groups selected from alkyl groups of 1 to 8 carbon atoms, aryl groups and vinyl groups. The use of such groups advantageously restrains the occurrence of cracks or pinholes in films.

Examples of the alkyl groups having 1 to 8 carbon atoms include methyl group, ethyl group, propyl group, n-butyl group, sec-butyl group and tert-butyl group. Examples of the aryl groups include phenyl group, benzyl group, tolyl group and o-xylyl group.

The letter n in Formula (1): $R_nM_1(OR')_{z-n}$ may be an integer of from 0 to (z−2) (wherein z is the valence of $M_1$). That is, the metal alkoxide may have at least two or more hydrolyzable groups.

The use of such metal alkoxides is advantageous in that oligomers including a linear oligomer may be formed.

The metal alkoxides represented by Formula (1) may be used singly, or a plurality of such metal alkoxides may be used as a mixture.

The oligomers may include a sub component derived from a metal alkoxide in which n is (z−1), namely, a metal alkoxide having only one hydrolyzable group.

Examples of such metal alkoxides include silicon alkoxide, zirconium alkoxide, titanium alkoxide and aluminum alkoxide.

The inorganic oxide fine particles are preferably oxide fine particles or composite oxide fine particles including one or more metal elements selected from titanium, zirconium, tin, niobium, tungsten, antimony, indium and aluminum.

The inorganic oxide fine particles may be conventional. The shapes of the fine particles may be any shapes such as spheres, rods, shapes with bulges such as "Konpeito", and hollow shapes. The fine particles may be crystalline or amorphous.

Particularly preferably, the inorganic oxide fine particles are crystalline fine particles. Crystalline inorganic oxide fine particles have high refractive index and high stability, and are suited for use in coatings for optical substrates.

Further, the inorganic oxide fine particles may be core-shell composite oxide fine particles. Known such core-shell composite oxide fine particles may be used.

As sub components, the inorganic oxide fine particles may further contain metal elements such as silicon, potassium, sodium, magnesium, calcium, barium, strontium, lithium, lanthanum, cerium, iron, cobalt, nickel, copper, zinc, hafnium, gallium and selenium.

The oligomer-modified inorganic oxide fine particles preferably have a unit viscosity in the range of 0.07 to 0.65 mPa·s/(wt %), and more preferably 0.10 to 0.50 mPa·s/(wt %). Here, the unit viscosity is obtained by dividing the viscosity of a methanol dispersion of the oligomer-modified inorganic oxide fine particles by the solid concentration of the dispersion.

When the oligomer-modified inorganic oxide fine particles have the above properties, a coating exhibits so high viscosity that the formation of thick films is advantageously facilitated.

If the unit viscosity is less than 0.07 mPa·s/(wt %), the coating exhibits low viscosity and consequently the thickness of films may be disadvantageously decreased. Any unit viscosity exceeding 0.65 mPa·s/(wt %) is not preferable because the coating viscosity is so high that fluidity is lowered.

The ratio of the weight (A) of modification by the oligomer to the weight (B) of the inorganic oxide fine particles is preferably in the range of (A)/(B)=0.05 to 5.0, and more preferably 0.10 to 4.0.

Any (A)/(B) ratio that is less than 0.05 is not preferable because the hardness of films may be decreased. If the (A)/(B) ratio exceeds 5.0, the abrasion resistance of films may be disadvantageously lowered.

The oligomer-modified inorganic oxide fine particles preferably have an average particle diameter in the range of 9 to 65 nm, and more preferably 9 to 45 nm. If the average particle diameter is less than 9 nm, the viscosity of a dispersion of the particles may be disadvantageously increased. Any average particle diameter exceeding 65 nm is not preferable because the transparency of films may be decreased.

The inorganic oxide fine particles preferably have an average particle diameter in the range of preferably 8 to 60 nm. If the average particle diameter is less than 8 nm, the viscosity of a dispersion may be disadvantageously increased. Any average particle diameter exceeding 60 nm is not preferable because the transparency of films may be decreased.

Dispersions

A dispersion according to the present invention includes the oligomer-modified inorganic oxide fine particles of the invention.

The dispersion further includes a dispersion solvent. The dispersion solvent may be water or at least one organic compound selected from alcohols such as methanol, ethanol, butanol, propanol and isopropyl alcohol, ethers such as ethylene glycol monomethyl ether, propylene glycol monomethyl ether and propylene glycol monoethyl ether, and ketones such as methyl ethyl ketone and γ-butyrolactone.

The dispersion may further contain sub components and additives as required such as light absorbers, conductive materials and coloring agents.

The solid concentration of the dispersion is preferably in the range of 10 to 50 wt %. If the solid concentration is less than 10 wt %, the solid concentration of a coating may be disadvantageously low.

Any solid concentration exceeding 50 wt % is not preferable because the coating viscosity may be excessively high.

The dispersions may be used in applications such as hardcoat materials, antireflection materials, reflective materials, catalysts, bonding materials, primers, crosslinking materials, insulating materials, conductive materials, adsorbing materials, decorative materials, optical path materials and fillers.

By its containing of the oligomer-modified inorganic oxide fine particles, the inventive dispersion has excellent effects such as the suppression of defects such as pinholes, voids and cracks, and excellent effects such as adhesion, hardness, abrasion resistance, chemical resistance, moisture resistance, transparency, weather resistance and light resistance.

Coatings

A coating according to the present invention includes the oligomer-modified inorganic oxide fine particles of the invention or the dispersion of the invention, and a matrix component.

The coatings may be used for the formation of various coating films such as hardcoat materials, antireflection materials, reflective materials, catalysts, bonding materials, primers, crosslinking materials, insulating materials, conductive materials, adsorbing materials, decorative materials, optical path materials and fillers. In particular, the coatings are suited for the production of films on optical substrates such as plastic lenses.

Because of its containing of the oligomer-modified inorganic oxide fine particles of the invention, the inventive coating can give films which have high hardness and abrasion resistance, excellent adhesion, transparency, light resistance, weather resistance and chemical resistance, and also high refractive index.

Examples of the matrix components include organosilicon compounds, thermosetting organic resins, thermoplastic organic resins and UV-curable organic resins.

Typical examples of the organosilicon compounds include alkoxysilane compounds such as tetraethoxysilane, methyltrimethoxysilane, vinyltrimethoxysilane, γ-methacryloxypropyltrimethoxysilane, α-glycidoxymethyltrimethoxysilane, α-glycidoxyethyltrimethoxysilane, β-glycidoxyethyltrimethoxysilane, γ-glycidoxypropyltrimethoxysilane, γ-glycidoxypropyltriethoxysilane, γ-glycidoxypropylmethyldimethoxysilane, γ-glycidoxypropylmethyldiethoxysilane, β-(3,4-epoxycyclohexyl)-ethyltrimethoxysilane, β-(3,4-epoxycyclohexyl)-ethyltriethoxysilane, γ-aminopropyltrimethoxysilane, γ-aminopropyltriethoxysilane, N-β(aminoethyl)-γ-aminopropylmethyldimethoxysilane and N-β(aminoethyl)-γ-aminopropylmethyldiethoxysilane. These compounds may be used singly, or two or more may be used as a mixture.

At least part of the organosilicon compound may be used in a hydrolyzed form. Such organosilicon compounds are particularly suitable as binder components in coating compositions for the formation of hardcoat films.

The thermosetting organic resin is preferably at least one selected from urethane resins, epoxy resins and melamine resins.

More specifically, examples of the urethane resins include products of reactions between blocked polyisocyanates such as hexamethylene diisocyanate, and active hydrogen-containing compounds such as polyester polyols and polyether polyols; and examples of the epoxy resins include polyalkylene ether-modified epoxy resins and epoxy group-containing compounds having a flexible skeleton (a soft segment) introduced in the molecular chain.

Further, examples of the melamine resins include cured products formed between etherified methylolmelamines and polyester polyols or polyether polyols. Of these, it is preferable to use urethane resins which are cured products formed between blocked isocyanates and polyols. The thermosetting organic resins may be used singly, or two or more may be used in combination.

The thermoplastic organic resin is preferably at least one selected from acrylic resins, urethane resins and ester resins, and is more preferably a self-emulsified aqueous emulsion resin. These resins are particularly suited as binder components in coating compositions for the formation of primer layers.

Examples of the UV-curable organic resins include UV-curable compounds such as polyfunctional acrylic compounds having an acryloyloxy group.

The content of the oligomer-modified inorganic oxide fine particles in the coating is not particularly limited, but is preferably in the range of 1 to 35 wt % on solid weight basis.

If the above content is less than 1 wt %, obtaining a desired film thickness may be sometimes difficult. Any content exceeding 35 wt % is not preferable because the coating viscosity may be excessively increased.

Methods for Producing Oligomer-Modified Inorganic Oxide Fine Particles

A method for producing oligomer-modified inorganic oxide fine particles according to the present invention includes the following Steps (1) and (2).

Step (1)

An acid catalyst and water are added to a metal alkoxide (or a mixture of metal alkoxides having different $M_1$, R, R' and n) and/or a hydrolyzate thereof, the metal alkoxide being represented by Formula (1):

$$R_nM_1(OR')_{z-n} \qquad (1)$$

wherein $M_1$: one or more elements selected from Si, Ti, Zr and Al;

R and R': one or more groups selected from alkyl groups of 1 to 8 carbon atoms, aryl groups and vinyl groups;

n: an integer of from 0 to (z−2); and z: the valence of $M_1$. The resultant mixture solution is subjected to hydrolysis and polycondensation at 60 to 120° C. for 20 minutes to 24 hours to form a mixture solution including a metal alkoxide oligomer.

Step (2)

The acid catalyst is removed from the mixture solution including the linear metal alkoxide oligomer produced in Step (1). Inorganic oxide fine particles including one or more metal elements selected from titanium, zirconium, tin, niobium, tungsten, antimony, indium and aluminum are added to the mixture solution. The resultant mixture is treated at 5 to 30° C. for 0.5 to 24 hours to allow the metal alkoxide oligomer to react with the surface of the inorganic oxide fine particles.

The steps will be discussed below.

Step (1)

In this step, a mixture solution is prepared which includes an oligomer of a metal alkoxide represented by Formula (1).

Examples of the metal alkoxides which may be used include silicon alkoxides such as tetraethyl orthosilicate, tetramethoxysilane and condensates thereof; zirconium alkoxides such as zirconium tetra-normal-propoxide and zirconium tributoxymonoacetylacetonate, and condensates thereof; and titanium alkoxides such as titanium tetraisopropoxide and titanium diisopropoxy bis(acetyl acetonate), and condensates thereof. Further, partial hydrolyzates and complete hydrolyzates of these alkoxides may be used, with examples including Silicate 40, Silicate 45, Silicate 48 and M Silicate 51 manufactured by TAMA CHEMICALS CO., LTD. Two or more of these compounds may be used as a mixture. Dispersions of these compounds in organic solvents may be used.

A metal alkoxide in which n is (z−1) may be added as a sub component without impairing the advantageous effects of the invention. That is, such addition is possible as long as the presence of a linear oligomer is ensured and the advantageous effects of the invention are obtained even in the local presence of a non-linear oligomer formed due to the addition of a metal alkoxide in which n is (z−1).

When a metal alkoxide in which n is (z−1) is added, the amount thereof may be generally less than 10 wt % of the total.

For example, the organic solvent may be at least one organic compound selected from alcohols such as methanol, ethanol, butanol, propanol and isopropyl alcohol, ethers such as ethylene glycol monomethyl ether, propylene glycol monomethyl ether and propylene glycol monoethyl ether, and ketones such as methyl ethyl ketone and γ-butyrolactone.

Where appropriate, further organic solvents such as modified alcohols may be added as additional dispersion solvents.

After the addition of an acid catalyst and water, the metal alkoxide and/or a hydrolyzate thereof is subjected to hydrolysis and polycondensation at 60 to 120° C. for 20 minutes to 24 hours. Thus, a linear oligomer may be formed by the polymerization of the metal alkoxide and/or the hydrolyzate thereof.

Examples of the acid catalysts include hydrochloric acid, nitric acid, sulfuric acid and acetic acid.

Without the use of acid catalysts, the formation of a linear oligomer fails and the obtainable films will disadvantageously exhibit low hardness, abrasion resistance and adhesion. The amount of water added may be an amount that is necessary and sufficient to hydrolyze the metal alkoxide.

The pH of the mixture solution during the hydrolysis and the polycondensation of the metal alkoxide is preferably in the range of 2 to 4. This acidic pH region ensures that a linear oligomer will be easily obtained by the hydrolysis of the metal alkoxide and/or a hydrolyzate thereof.

The temperature is advantageously in the range of 60 to 120° C., and more preferably 80 to 110° C. Any temperatures less than 60° C. disadvantageously make it difficult to obtain the desired molecular weight. If the temperature exceeds 120° C., the molecular weight is increased to an excessive extent.

The hydrolysis time is advantageously in the range of 20 minutes to 24 hours, and more preferably 30 minutes to 12 hours. If the time is less than 20 minutes, the molecular weight is disadvantageously lowered. Any duration of time exceeding 24 hours is not preferable for economic reasons.

The oligomer present in the final mixture solution preferably has a polymerization degree of not less than 3, more preferably 6 to 100, and still more preferably 15 to 90, and an average molecular weight in the range of 1000 to 10000, and more preferably 3000 to 9000.

If the polymerization degree of the oligomer is less than 3, the hardness of films containing the oligomer-modified inorganic oxide fine particles may be disadvantageously decreased. Any polymerization degree of the oligomer exceeding 100 is not preferable at times because the dispersion viscosity may be excessively increased.

Step (2)

In this step, the acid catalyst is removed from the mixture solution produced in Step (1), thereafter inorganic oxide fine particles including one or more metal elements selected from titanium, zirconium, tin, niobium, tungsten, antimony, indium and aluminum are added to the mixture solution, and the mixture is treated at 5 to 30° C. for 0.5 to 24 hours to allow the metal alkoxide oligomer to react with the surface of the inorganic oxide fine particles, thereby obtaining a dispersion containing oligomer-modified inorganic oxide fine particles.

By the modification of the surface of the inorganic oxide fine particles with the oligomers including a linear oligomer from Step (1), a heretofore impossible dense and thick network of the oligomers may be formed on the surface of the particles.

The oligomer-modified inorganic oxide fine particles designed to include the linear oligomer are stable and have excellent reactivity with respect to a matrix component. Coatings including such oligomer-modified inorganic oxide fine particles can give films which have very high hardness and excellent transparency, abrasion resistance and adhesion.

After the completion of the oligomer polycondensation reaction in Step (1), the acid catalyst may be removed from the mixture solution by such a method as an ion exchange method or an ultrafiltration membrane method. Water also may be removed as required.

The inorganic oxide fine particles including one or more metal elements selected from titanium, zirconium, tin, niobium, tungsten, antimony, indium and aluminum are advantageous in that they have high refractive index and the addition thereof to films provides excellent film hardness.

The inorganic oxide fine particles may be simple oxide particles, composite oxide fine particles, or core-shell fine particles.

The shapes of the particles may be any of known shapes such as spheres, rods, shapes with bulges such as "Konpeito", and hollow shapes.

Any of such known inorganic oxide fine particles may be used.

For example, the inorganic oxide fine particles may be produced by liquid phase methods such as hydrolysis, neutralization and coprecipitation of metal salts or metal alkoxides, or by hydrothermal synthesis methods or solid phase methods. The thus-obtained particles may be crystallized by methods such as calcination.

The inorganic oxide fine particles may further include other metal element components as sub components.

The particles may be in the form of a powder or a dispersion. In the case of a dispersion, the dispersion medium is preferably an organic solvent and is particularly preferably at least one organic compound selected from alcohols such as methanol, ethanol, butanol, propanol and isopropyl alcohol, ethers such as ethylene glycol monomethyl ether, propylene glycol monomethyl ether and propylene glycol monoethyl ether, and ketones such as methyl ethyl ketone and γ-butyrolactone.

Additional organic solvents may be further added as required.

For example, the inorganic oxide fine particles may be produced by or in accordance with the methods described in JP-A-2000-204301, JP-A-2011-132484, JP-A-2011-037659 and JP-A-H05-2102.

Here, the ratio of the weight (A) of modification by the oligomer to the weight (B) of the inorganic oxide fine particles is preferably in the range of (A)/(B)=0.05 to 5.0, and more preferably 0.1 to 4.0. The (A)/(B) weight ratio may be adjusted by adding the inorganic oxide fine particles to the oligomer-containing mixture solution in Step (2) such that the ratio of the solid weight of the solution to the solid weight of the inorganic oxide fine particles will be 5 to 50.

The temperature at which the mixture solution is treated is advantageously 5 to 30° C., and more preferably 5 to 20° C. If the treatment temperature is less than 5° C., the viscosity of the mixture solution is so high that the stirring efficiency is disadvantageously decreased. Any treatment temperature higher than 30° C. is not preferable because the oligomer viscosity tends to be disadvantageously increased.

The treatment time is advantageously 0.5 to 24 hours, and more preferably 1.0 to 20 hours. Any treatment time that is less than 0.5 hours disadvantageously does not allow the surface of the inorganic fine particles to be treated sufficiently. If the treatment time exceeds 24 hours, economic disadvantages are caused.

The dispersion of the oligomer-modified inorganic oxide fine particles obtained as described above may be subjected to further steps such as solvent replacement and concentration as required.

Coating Production Methods

The coating according to the present invention may be produced by mixing the dispersion of the oligomer-modified inorganic oxide fine particles obtained through the aforementioned steps, with a matrix component.

Examples of the matrix components include the aforementioned organosilicon compounds, thermosetting organic resins, thermoplastic organic resins and UV-curable organic resins.

An example of the preparation of the inventive coating involving an organosilicon compound as the matrix will be discussed. In this case, it is preferable that the organosilicon compound be partially hydrolyzed or completely hydrolyzed in the presence of an acid and water without a solvent or in a polar organic solvent such as an alcohol, and thereafter the hydrolyzate be mixed with the dispersion of the oligomer-modified inorganic oxide fine particles. Alternatively, the organosilicon compound and the dispersion of the oligomer-modified inorganic oxide fine particles may be mixed with each other and be thereafter subjected to partial or complete hydrolysis.

In the mixing, the weight ratio (X/Y) is preferably 30/70 to 90/10, and more preferably 35/65 to 80/20 wherein X is the weight of the organosilicon compound in terms of $SiO_2$ and Y is the weight of the oligomer-modified inorganic oxide fine particles present in the dispersion of the oligomer-modified inorganic oxide fine particles.

When thermosetting organic resins and thermoplastic resins are used as the matrixes, the coatings are prepared by mixing the resins with the dispersion of the oligomer-modified inorganic oxide fine particles. The proportions are preferably such that the weight ratio (R/S) is 90/10 to 30/70, and more preferably 80/20 to 35/65 wherein R is the weight of the resins and S is the weight of the oligomer-modified inorganic oxide fine particles present in the dispersion of the oligomer-modified inorganic oxide fine particles.

Preferably, the coating composition further includes a UV absorber.

The UV absorbers may be any of known UV absorbers or any of UV absorbers currently under development. Typical UV absorbers may be used, with examples including optically stable organic compounds such as benzophenone compounds, cinnamic acid compounds, p-aminobenzoic acid compounds and salicylic acid compounds, and perovskite composite oxides such as calcium titanate, barium titanate and strontium titanate.

EXAMPLES

The present invention will be described in further detail based on Examples hereinbelow. However, the scope of the invention is not limited to such Examples.
[Measurement Methods and Evaluation Test Methods]
Next, the measurement methods and the evaluation test methods used in Examples of the invention and other studies are described in detail below.

(1) Method for Measuring Average Particle Diameter 20 g of an aqueous dispersion of inorganic oxide fine particles (solid content 0.15 wt %) or a methanol dispersion of oligomer-modified inorganic oxide fine particles (solid content 0.15 wt %) was placed in a quartz cell 1 cm in length, 1 cm in width and 5 cm in height, and the particle size distribution of the particles was determined by a dynamic light scattering method with an ultrafine particle size analyzer (ELS-Z2 manufactured by OTSUKA ELECTRONICS CO., LTD.). The average particle diameter as used in the invention indicates a value calculated by analyzing the measurement results by a cumulant method.

(2) Method for Measuring Specific Surface Area

Approximately 30 ml of a powder that had been obtained by drying a dispersion of inorganic oxide fine particles was placed into a magnetic crucible (B-2 model), dried at 300° C. for 2 hours, and cooled to room temperature in a desiccator. Next, a 1 g sample was analyzed with an automated surface area measuring apparatus (MULTISORB 12 manufactured by YUASA IONICS CO., LTD.) to determine the specific surface area ($m^2/g$) of the particles by a BET method.

(3) Method for Analyzing Composition of Inorganic Oxide Fine Particles

The weights of metal elements contained in inorganic oxide fine particles were determined on oxide basis with use of an ICP apparatus (ICPS-8100 and analysis software ICPS-8000 manufactured by SHIMADZU CORPORATION).

(4) pH Measuring Method

The pH was measured with a pH meter (F22 manufactured by HORIBA, Ltd.).

In the case where the dispersion medium of the sample was based on an organic solvent, 50 ml of the sample was diluted ten times with distilled water.

(5) Viscosity Measurement

The sample was 20 ml of a methanol dispersion of oligomer-modified inorganic oxide fine particles (solid concentration 30.5 wt %), and its viscosity was measured at room temperature with a viscometer (TV-10M manufactured by TOKI SANGYO CO., LTD.). The rotational speed of the rotor of the viscometer was 60 rpm when the viscosity was in the range of 1.0 to 10.0 mPa·s, 30 rpm in the range of 10.0 to 20.0 mPa·s, 12 rpm in the range of 20.0 to 50.0 mPa·s, and 6 rpm in the range of 50.0 to 100.0 mPa·s.

(6) [Method for Measuring Average Molecular Weight of Oligomers]

A mixture solution containing an oligomer (solid concentration 10.0 wt %) weighing 15.0 g and tetrahydrofuran (manufactured by KANTO CHEMICAL CO., INC.) weighing 35.0 g were mixed with each other to give a sample having a solid concentration of 3.0%. A 0.1 ml portion of the sample was collected with a microsyringe and analyzed by gel permeation chromatography (HLC-8120GPC manufactured by TOSOH CORPORATION) with columns (TSK-GEL G3000HLL and TSK-GEL G2500HXL manufactured by TOSOH CORPORATION), thereby measuring the weight average molecular weight of the oligomer relative to polystyrenes.

(7) [Method for Measuring Polymerization Degree of Oligomers]

The polymerization degree was obtained by dividing the average molecular weight of the oligomer determined by the aforementioned method, by the molecular weight of the repeating monomer unit assuming that the metal alkoxide was linearly polymerized via hydrolyzable groups.

In the case where a plurality of metal alkoxide monomers had been mixed, the molecular weights of the respective repeating monomer units were averaged in accordance with the respective weights of the monomers used, and the polymerization degree was determined from the thus-calculated unit molecular weight.

When the oligomers included a component derived from a metal alkoxide in which n was (z−1), the molecular weight derived from this metal alkoxide was regarded as error and was not included in the calculation.

Curable Films (8) Method for Measuring Film Hardness (Bayer Value)

A Bayer value was measured by determining changes in haze of a test lens fabricated in Preparation Example in Examples and a standard lens, with use of abrasion tester BTM (manufactured by COLTS Laboratories, Inc., USA) and a haze meter (NDH2000 manufactured by NIPPON DENSHOKU INDUSTRIES CO., LTD.). The standard lens was commercial plastic lens substrate CR-39 (diethylene glycol bis-allyl carbonate, monomer from PPG being used, refractive index of substrate: 1.60). First, the haze value of each lens was measured. The initial haze value of the standard lens was defined as D (std0), and that of the test lens was defined as D (test0). Each lens was placed on a pan of the abrasion tester, and an abrasive (sand) weighing 500 g was spread on the lens. The lens was then moved left and right 600 times. The haze value of the standard lens after the test was defined as D (stdf), and that of the test lens after the test was defined as D (testf). The Bayer test value (R) was calculated by the following equation.

$$R=[D(\text{stdf})-D(\text{std0})]/[D(\text{testf})-D(\text{test0})]$$

(9) Method for Evaluating Appearance of Films (Interference Fringes)

Fluorescent lamp "trade name: Mellow 5N" (three-wavelength neutral white fluorescent lamp manufactured by TOSHIBA LIGHTING & TECHNOLOGY CORPORATION) was attached in a box having black inside walls. The light from the fluorescent lamp was caused to be reflected on the surface of an antireflection film disposed on a hardcoat layer film (containing the oligomer-modified inorganic oxide fine particles) of a sample substrate. A rainbow pattern (interference fringes) resulting from the interference of light was visually evaluated based on the following criteria.

S: There were substantially no interference fringes.
A: Interference fringes were inconspicuous.
B: Interference fringes were observed but were acceptable.
C: Interference fringes were conspicuous.
D: Interference fringes were glistening.

(10) Method for Evaluating Appearance of Films (Cloudiness)

Fluorescent lamp "trade name: Mellow 5N" (three-wavelength neutral white fluorescent lamp manufactured by TOSHIBA LIGHTING & TECHNOLOGY CORPORATION) was attached in a box having black inside walls. A sample substrate which had a hardcoat layer film containing the oligomer-modified inorganic oxide fine particles was placed vertically immediately below the fluorescent lamp. The transparency (the degree of cloudiness) was visually evaluated based on the following criteria.
   A: Not cloudy
   B: Slightly cloudy
   C: Cloudy
   D: Markedly cloudy
   (11) Method for Evaluating Abrasion Resistance of Films
   The surface of a test piece fabricated in Preparation Example in Examples was rubbed with BONSTAR STEEL WOOL No. 0000 (manufactured by NIPPON STEEL WOOL CO., LTD.) with a load of 1 kg, over a distance of 3 cm at 50 reciprocations/100 seconds. The level of scratches was visually evaluated based on the following criteria.
   A: The surface was substantially free from scratches.
   B: The surface had slight scratches.
   C: The surface had marked scratches.
   D: Scratches were present on almost the entire rubbed area.
   (12) Method for Evaluating Adhesion of Films
   The lens surface of a sample substrate having a hardcoat layer film was cut with a knife at intervals of 1 mm so as to create one hundred 1 mm$^2$ squares. A pressure-sensitive adhesive cellophane tape was strongly pressed against the lattice pattern and was quickly pulled at an angle of 90° to the in-plane direction of the plastic lens substrate. This procedure was performed five times, and the number of the remaining squares was counted. The adhesion was evaluated based on the following criteria.
   Good: 95 or more squares remained.
   Poor: Less than 95 squares remained.
   (13) Method for Evaluating Weather Resistant Adhesion of Films
   A sample substrate having a hardcoat layer film was subjected to an exposure test with a xenon weather meter (X-75 manufactured by Suga Test Instruments Co., Ltd.). Thereafter, the appearance was observed and the adhesion was tested by the aforementioned method. The evaluation was made based on the following criteria. The exposure time was 250 hours for substrates having an antireflection film and was 50 hours for substrates without an antireflection film.
   Good: 95 or more squares remained.
   Poor: Less than 95 squares remained.
   (14) Method for Evaluating Light Resistance of Films
   A test piece was irradiated with UV rays with a fade test mercury lamp (H400-E manufactured by TOSHIBA CORPORATION) for 50 hours. The color of the lens was visually observed before and after the test, and light resistance was evaluated based on the following criteria. The irradiation distance between the lamp and the test piece was 70 mm. The output of the lamp was adjusted such that the surface temperature of the test piece was 45±5° C. The test piece was a plastic lens which had an antireflection film on the surface of a hardcoat layer.
   ○: The lens was not substantially discolored.
   Δ: The lens was slightly discolored.
   x: The lens was markedly discolored.

Example 1

Standard Example

Preparation (1) of Inorganic Oxide Fine Particles (Preparation of Core Particles)
   93.7 kg of an aqueous titanium tetrachloride solution containing 7.75 wt % in terms of TiO$_2$ of titanium tetrachloride (manufactured by OSAKA Titanium technologies Co., Ltd.) was mixed with 36.3 kg of ammonia water containing 15 wt % of ammonia (manufactured by UBE INDUSTRIES, LTD.) to give a white slurry having a pH of 9.5. The slurry was then filtered and was washed with pure water to afford 72.6 kg of a hydrous titanic acid cake having a solid content of 10 wt %.
   Next, the cake was mixed with 83.0 kg of a hydrogen peroxide solution containing 35 wt % of hydrogen peroxide (manufactured by MITSUBISHI GAS CHEMICAL COMPANY, INC.) and 411.4 kg of pure water. The mixture was heated at 80° C. for 1 hour while performing stirring, and 159.0 kg of pure water was added. Thus, 726.0 kg of an aqueous peroxytitanic acid solution containing 1 wt % in terms of TiO$_2$ of peroxytitanic acid was obtained. The aqueous peroxytitanic acid solution was transparent yellow-brown and had a pH of 8.5.
   Subsequently, 72.9 kg of the aqueous peroxytitanic acid solution was mixed with 3.5 kg of a cation exchange resin. To the mixture, 9.1 kg of an aqueous potassium stannate solution containing 1 wt % in terms of SnO$_2$ of potassium stannate (manufactured by SHOWA KAKO CORPORATION) was gradually added while performing stirring.
   The cation exchange resin (manufactured by Mitsubishi Chemical Corporation) which had captured ions such as potassium ions was separated. Thereafter, the liquid was mixed with 0.8 kg of a silica sol which contained 15 wt % of silica fine particles having an average particle diameter of 7 nm (manufactured by JGC Catalysts and Chemicals Ltd.) and with 18.0 kg of pure water. The resultant mixture was heated in an autoclave (manufactured by Taiatsu Techno Corporation, 120 L) at 165° C. for 18 hours. Thus, an aqueous dispersion (C-1) containing titanium-based composite oxide fine particles (core particles) was obtained.
   The aqueous dispersion obtained was cooled to room temperature and was concentrated with an ultrafiltration membrane apparatus (ACV-3010 manufactured by Asahi Kasei Corporation) to give 10.0 kg of an aqueous dispersion having a solid content of 10 wt %.
   The core particles contained in this aqueous dispersion had a rutile crystal structure. The core particles were found to contain 75.2 wt % of TiO$_2$, 9.3 wt % of SnO$_2$, 12.2 wt % of SiO$_2$ and 3.3 wt % of K$_2$O.
(Preparation of Core-Shell Inorganic Oxide Fine Particles)
   While performing stirring, ammonia water containing 15 wt % of ammonia was gradually added to 26.3 kg of an aqueous zirconium oxychloride solution containing 2 wt % in terms of ZrO$_2$ of zirconium oxychloride (manufactured by TAIYO KOKO CO., LTD.). Thus, a slurry with a pH of 8.5 was obtained. The slurry was filtered and was washed with pure water to give 5.26 kg of a cake which contained 10 wt % in terms of ZrO$_2$ of a zirconium component.
   Next, 1.80 kg of pure water was added to 200 g of the cake. Further, the pH was adjusted to alkaline by the addition of 120 g of an aqueous potassium hydroxide solution containing 10 wt % of potassium hydroxide (manufactured by KANTO CHEMICAL CO., INC.). Thereafter, 400 g of a hydrogen peroxide solution containing 35 wt % of hydrogen peroxide was added, and the mixture was heated to 50° C. to dissolve the cake. Further, 1.48 kg of pure water was added. Thus, 4.0 kg of an aqueous peroxyzirconic acid solution was obtained which contained 0.5 wt % in terms of ZrO$_2$ of peroxyzirconic acid. The pH of the aqueous peroxyzirconic acid solution was 12.2.

Separately, commercial water glass (manufactured by AGC Si-Tech Co., Ltd.) was diluted with pure water and was dealkalized with a cation exchange resin (manufactured by Mitsubishi Chemical Corporation). Thus, an aqueous silicic acid solution containing 2 wt % in terms of $SiO_2$ of silicic acid liquid was obtained. The pH of the aqueous silicic acid solution was 2.3.

Next, 12.0 kg of pure water was added to 3.0 kg of the aqueous dispersion (C-1) obtained in the aforementioned step which contained the titanium-based core particles, thereby controlling the solid content to 2 wt %. The dispersion was then heated to 90° C., and 1020 g and 795 g of the aqueous peroxyzirconic acid solution and the aqueous silicic acid solution, respectively, were gradually added to the dispersion. After the completion of the addition, the mixture was aged at 90° C. for 1 hour while performing stirring.

The mixture liquid was heat treated in an autoclave (manufactured by Taiatsu Techno Corporation, 50 L) at 160° C. for 18 hours. After being cooled to room temperature, the liquid was concentrated with an ultrafiltration membrane apparatus (SIP-1013 manufactured by Asahi Kasei Corporation) to a solid content of 10 wt %. Thus, an aqueous dispersion (CW-1) was prepared which contained core-shell inorganic oxide fine particles including the titanium-based core particles and a shell of a zirconium- and silicon-containing composite oxide covering the surface of the core particles.

The crystal structure of the core-shell inorganic oxide fine particles was a rutile structure.

The core-shell inorganic oxide fine particles were found to contain 61.5 wt % of $TiO_2$, 7.6 wt % of $SnO_2$, 22.2 wt % of $SiO_2$, 4.8 wt % of $ZrO_2$ and 3.9 wt % of $K_2O$.

The core-shell inorganic oxide fine particles had an average particle diameter of 21 nm as measured by a dynamic light scattering method, and a BET specific surface area of 224 $m^2/g$.

The core-shell fine particles were used as inorganic oxide fine particles in this Example.

While performing stirring, 204 g of a cation exchange resin was added to 2000 g of the aqueous dispersion (CW-1) of the core-shell inorganic oxide fine particles obtained in the aforementioned step. After the mixture was stirred for 1 hour at room temperature, the resin was separated. Water that was the dispersion solvent of the aqueous dispersion was replaced by methanol (manufactured by HAYASHI PURE CHEMICAL IND., LTD., methyl alcohol concentration: 99.9 wt %) with use of an ultrafiltration membrane apparatus (filtration membrane SIP-1013 manufactured by Asahi Kasei Corporation).

The methanol dispersion of the core-shell inorganic oxide fine particles (hereinafter "CM-1") had a water content of about 0.5 wt % and a solid concentration of 10 wt %. The average particle diameter of the core-shell inorganic oxide fine particles present in the methanol dispersion was 21 nm.

Preparation (1) of Oligomer-Modified Inorganic Oxide Fine Particles
Step (1)
Preparation (1) of Oligomer-Containing Mixture Solution While performing stirring, 10.9 kg of a 0.15% aqueous hydrochloric acid solution was added to a mixture liquid including 17.6 kg of methyl polysilicate (M Silicate 51 manufactured by TAMA CHEMICALS CO., LTD., polymerization degree 3 to 5, average molecular weight 470) and 61.5 kg of a modified alcohol (EKINEN F-1 manufactured by Japan Alcohol Trading Co., Ltd.). The resultant mixture liquid was stirred at room temperature for 15 minutes and was heated in an autoclave (manufactured by Taiatsu Techno Corporation, 120 L) at 100° C. for 60 minutes. Thus, 88.9 kg of a mixture solution (P-1) was obtained which contained an oligomer of the silicon-containing metal alkoxide.

The mixture solution obtained had a solid content of 10.0 wt % and a pH of 3.3. The average molecular weight of the oligomer in the mixture solution was 3600, and the average polymerization degree was 34.0 assuming that the molecular weight of the metal alkoxide repeating unit was 106 (structural formula of the repeating unit $\{—SiO(OCH_3)_2—\}$).

Step 2

An amphoteric ion exchange resin weighing 150 g was added to 0.5 kg of the mixture solution (P-1). After the mixture was stirred at room temperature for 3 hours, the resin was separated. Thus, a mixture solution cleaned of the acid catalyst, namely, hydrochloric acid, was obtained.

While stirring 1.5 kg of the methanol dispersion (CM-1) of the core-shell inorganic oxide fine particles prepared in the aforementioned step, 0.5 kg of the acid catalyst-free mixture solution of the oligomer obtained in the above step was dropped to the methanol dispersion.

Further, the resultant mixture solution was stirred at 10° C. for 18 hours and was concentrated with an ultrafiltration membrane apparatus (SIP-1013 manufactured by Asahi Kasei Corporation) to a solid content of 30.5 wt %. Thus, 650.0 g of a methanol dispersion (CP-1) of oligomer-modified core-shell inorganic oxide fine particles was obtained.

The oligomer-modified inorganic oxide fine particles had an average particle diameter of 23 nm according to a dynamic light scattering method. The dispersion of the oligomer-modified fine particles had a pH of 4.5 and a viscosity of 3.3 mPa·s. Further, the solid concentration and the unit viscosity of the methanol dispersion of the oligomer-modified fine particles were 30.5 wt % and 0.11 mPa·s/(wt %).

Preparation of Hardcoat Layer-Forming Coating Composition (H1)

While performing stirring, 60.43 g of a 0.01 N aqueous hydrochloric acid solution was dropped to a mixture liquid including 177.3 g of γ-glycidoxypropyltrimethoxysilane (Z-6040 manufactured by Dow Corning Toray Co., Ltd.) and 31.4 g of methanol (manufactured by HAYASHI PURE CHEMICAL IND., LTD., methyl alcohol concentration: 99.9 wt %). The resultant mixture liquid was stirred at room temperature for a whole day and night to hydrolyze the silane compound.

Subsequently, the vessel containing the hydrolysis liquid was charged with 279.9 g of methanol (manufactured by HAYASHI PURE CHEMICAL IND., LTD., methyl alcohol concentration: 99.9 wt %), 402.1 g of the 30.5 wt % methanol dispersion (CP-1) of the oligomer-modified inorganic oxide fine particles prepared in this Example, 40.6 g of propylene glycol monomethyl ether (manufactured by The Dow Chemical Company), 7.1 g of tris(2,4-pentanedionato)aluminum III (manufactured by TOKYO CHEMICAL INDUSTRY CO., LTD.), and 1.1 g of a silicone surfactant (L-7604 manufactured by Dow Corning Toray Co., Ltd.) serving as a leveling agent. The resultant mixture was stirred at room temperature for a whole day and night to give a hardcoat layer-forming coating composition (H1).

Preparation of Primer Layer-Forming Coating Composition (P1)

A vessel was provided which contained 161.0 g of a commercial thermoplastic resin, namely, polyurethane emulsion "SUPER FLEX 150" (manufactured by DAI-ICHI KOGYO SEIYAKU CO., LTD., water-dispersed urethane elastomer solid content: 30%). The vessel was charged with 205.9 g of the methanol dispersion (CP-1) of the oligomer-modified fine particles prepared in this Example and 97.1 g of ion exchange water. The mixture was stirred for 1 hour.

Next, the resultant mixture liquid was mixed with 535.7 g of methanol (manufactured by HAYASHI PURE CHEMICAL IND., LTD., methyl alcohol concentration: 99.9 wt %) and 0.3 g of a silicone surfactant (L-7604 manufactured by Dow Corning Toray Co., Ltd.) serving as a leveling agent. The mixture was stirred at room temperature for a whole day and night to give a primer layer-forming coating composition (P1).

Example 2

Preparation (2) of Oligomer-Modified Inorganic Oxide Fine Particles

Step (1)
Preparation (2) of Oligomer-Containing Mixture Solution

While performing stirring, 10.9 kg of a 0.15% aqueous hydrochloric acid solution was added to a mixture liquid including 15.8 kg of methyl polysilicate (M Silicate 51 manufactured by TAMA CHEMICALS CO., LTD., based on $Si_nO_{(n-1)}(OCH_3)_{2(n+1)}$, polymerization degree 3 to 5, average molecular weight 470, repeating unit {—SiO(OCH$_3$)$_2$—} (molecular weight 106)), 18.0 kg of a 2-propanol solution (concentration 10%) of zirconium tributoxymonoacetyl acetonate (ORGATIX ZC-540 manufactured by Matsumoto Fine Chemical Co., Ltd., containing Zr(O-n-C$_4$H$_9$)$_3$(C$_3$H$_7$O$_2$) (molecular weight 409), repeating unit [—ZrO(OC$_4$H$_9$)(C$_5$H$_7$O$_2$)—] (molecular weight 279)), and 45.3 kg of a modified alcohol (EKINEN F-1 manufactured by Japan Alcohol Trading Co., Ltd.). The resultant mixture liquid was stirred at room temperature for 15 minutes and was heated in an autoclave (manufactured by Taiatsu Techno Corporation, 120 L) at 100° C. for 30 minutes. Thus, 89.0 kg of a mixture solution (P-2) was obtained which contained an oligomer of the silicon- and zirconium-containing metal alkoxides.

The mixture solution obtained had a solid content of 10.0 wt % and a pH of 3.3. The molecular weight of the oligomer in the mixture solution was 5000. The weight ratio of the repeating units {—SiO(OCH3)2-} (molecular weight 106) to the repeating units [—ZrO(OC4H9)(C5H7O2)-] (molecular weight 279) was 9:1. From this weight ratio, the weights of the respective repeating units provided an average molecular weight as 123.3. Thus, the polymerization degree was 40.6.

Step 2
A methanol dispersion (CP-2) of titanium-based inorganic oxide fine particles modified with a silicon-containing oligomer was obtained in the same manner as described in the "preparation of the methanol dispersion of oligomer-modified fine particles" in Example 1, except that in the "preparation of the methanol dispersion of oligomer-modified inorganic oxide fine particles" described in Example 1, the step involved 0.5 kg of the silicon- and zirconium-containing polymer dispersion (P-2) prepared in this Example instead of 0.5 kg of the silicon-containing polymer dispersion (P-1) prepared in Example 1.

The oligomer-modified fine particles had an average particle diameter of 27 nm according to a dynamic light scattering method. The dispersion of the oligomer-modified fine particles had a pH of 4.5 and a viscosity of 3.3 mPa·s.

Further, the solid concentration of the oligomer-modified fine particles and the unit viscosity were 30.5% and 0.11 mPa·s/%.

Preparation of Hardcoat Layer-Forming Coating Composition (H2)

While performing stirring, 60.43 g of a 0.01 N aqueous hydrochloric acid solution was dropped to a mixture liquid including 177.3 g of γ-glycidoxypropyltrimethoxysilane (Z-6040 manufactured by Dow Corning Toray Co., Ltd.) and 31.4 g of methanol (manufactured by HAYASHI PURE CHEMICAL IND., LTD., methyl alcohol concentration: 99.9 wt %). The resultant mixture liquid was stirred at room temperature for a whole day and night to hydrolyze the silane compound.

Subsequently, the vessel containing the hydrolysis liquid was charged with 279.9 g of methanol (manufactured by HAYASHI PURE CHEMICAL IND., LTD., methyl alcohol concentration: 99.9 wt %), 402.1 g of the 30.5 wt % methanol dispersion (CP-2) of the oligomer-modified fine particles prepared in this Example, 40.6 g of propylene glycol monomethyl ether (manufactured by The Dow Chemical Company), 7.1 g of tris(2,4-pentanedionato)aluminum III (manufactured by TOKYO CHEMICAL INDUSTRY CO., LTD.), and 1.1 g of a silicone surfactant (L-7604 manufactured by Dow Corning Toray Co., Ltd.) serving as a leveling agent. The resultant mixture was stirred at room temperature for a whole day and night to give a hardcoat layer-forming coating composition (H2).

Example 3

Preparation (3) of Oligomer-Modified Inorganic Oxide Fine Particles

Step (1)
Preparation (3) of Oligomer-Containing Mixture Solution

A mixture solution (P-3) which contained an oligomer of a silicon-containing metal alkoxide was obtained in the same manner as described in "Preparation (1) of oligomer-containing mixture solution" in Example 1, except that after the mixture liquid of the methyl polysilicate, the modified alcohol and the aqueous hydrochloric acid solution was stirred at room temperature for 15 minutes in the step described in "Preparation (1) of oligomer-containing mixture solution" in Example 1, the mixture liquid was heated in the autoclave at 100° C. for 240 minutes instead of being heated at 100° C. for 60 minutes.

The mixture solution obtained had a solid content of 10.0 wt % and a pH of 3.3. The molecular weight of the oligomer was 9000, and the polymerization degree was 84.9 assuming that the molecular weight of the repeating unit was 106.

Step 2
A methanol dispersion (CP-3) of oligomer-modified inorganic oxide fine particles was obtained in the same manner as described in Step (2) of "Preparation (1) of oligomer-modified inorganic oxide fine particles" in Example 1, except that 0.5 kg of the oligomer mixture solution (P-3) was used in place of the mixture solution (P-1) of Example 1.

The oligomer-modified inorganic oxide fine particles had an average particle diameter of 23 nm according to a dynamic light scattering method. The methanol dispersion of the oligomer-modified inorganic oxide fine particles had a pH of 4.5 and a viscosity of 3.5 mPa·s. Further, the solid concentration and the unit viscosity of the methanol dispersion of the oligomer-modified inorganic oxide fine particles were 30.5 wt % and 0.11 mPa·s/(wt %).

Preparation of Hardcoat Layer-Forming Coating Composition (H3)

While performing stirring, 60.43 g of a 0.01 N aqueous hydrochloric acid solution was dropped to a mixture liquid including 177.3 g of γ-glycidoxypropyltrimethoxysilane (Z-6040 manufactured by Dow Corning Toray Co., Ltd.) and 31.4 g of methanol (manufactured by HAYASHI PURE CHEMICAL IND., LTD., methyl alcohol concentration: 99.9 wt %). The resultant mixture liquid was stirred at room temperature for a whole day and night to hydrolyze the silane compound.

Subsequently, the vessel containing the hydrolysis liquid was charged with 279.9 g of methanol (manufactured by HAYASHI PURE CHEMICAL IND., LTD., methyl alcohol concentration: 99.9 wt %), 402.1 g of the 30.5 wt % methanol dispersion (CP-3) of the oligomer-modified inorganic oxide fine particles prepared in this Example, 40.6 g of propylene glycol monomethyl ether (manufactured by The Dow Chemical Company), 7.1 g of tris(2,4-pentanedionato)aluminum III (manufactured by TOKYO CHEMICAL INDUSTRY CO., LTD.), and 1.1 g of a silicone surfactant (L-7604 manufactured by Dow Corning Toray Co., Ltd.) serving as a leveling agent. The resultant mixture was stirred at room temperature for a whole day and night to give a hardcoat layer-forming coating composition (H3).

Example 4

Preparation (2) of Inorganic Oxide Fine Particles (Preparation of Core Particles)

Zirconium oxychloride octahydrate ($ZrOCl_2 \cdot 8H_2O$, manufactured by TAIYO KOKO CO., LTD.) weighing 0.50 kg was dissolved in 18.57 kg of pure water. To the resultant solution, 17.56 kg of an aqueous KOH solution having a concentration of 10 wt % was added. Thus, a zirconium hydroxide hydrogel ($ZrO_2$ concentration: 1 wt %) was prepared. The zirconium hydroxide hydrogel was washed by an ultrafiltration membrane method until the conductivity was lowered to not more than 0.5 mS/cm.

20.24 kg of an aqueous KOH solution having a concentration of 10 wt % was added to 102.75 kg of the above-obtained zirconium hydroxide hydrogel having a concentration in terms of $ZrO_2$ of 1 wt %. After the mixture was sufficiently stirred, 0.56 kg of an aqueous hydrogen peroxide solution having a concentration of 35 wt % was added thereto. The resultant solution was vigorously bubbled, and became transparent with a pH of 11.4.

Next, 5.63 kg of an aqueous ammonia solution having a concentration of 28.8 wt % was added to the solution, and the mixture was sufficiently stirred to give a precursor slurry of zirconia-containing core particles. The slurry was light yellow and had a pH of 13.4.

The precursor slurry was divided into equal three portions, placed into an autoclave (manufactured by Taiatsu Techno Corporation, 100 L) and hydrothermally treated at 150° C. for 11 hours. The zirconia-containing composite oxide fine particles were separated by a centrifugal sedimentation method, then washed sufficiently, and dispersed into ion exchange water. In this manner, 10.10 kg of an aqueous dispersion of the zirconium-based composite oxide fine particles (core particles) was obtained. The solid content in the aqueous dispersion was 10 wt % in terms of $ZrO_2$.

Next, the aqueous dispersion of the core particles weighing 10.10 kg was spray dried by being sprayed into a spray dryer (NIRO ATOMIZER manufactured by NIRO). As a result, 0.90 kg of a dry powder of the zirconium-based composite oxide fine particles (core particles) was obtained.

The core particles contained in the dry powder had an average particle diameter of about 2 μm.

Next, the 0.90 kg dry powder obtained above was calcined at 500° C. for 2 hours in an air atmosphere to give 0.84 kg of a calcined powder of the zirconium-based composite oxide fine particles (core particles).

The calcined powder weighing 0.84 kg was dispersed in 0.74 kg of pure water. To the dispersion, 0.55 kg of a 28.6% aqueous tartaric acid solution and 0.23 kg of a 50 wt % aqueous KOH solution were added, the resultant mixture being sufficiently stirred. Thereafter, alumina beads having a particle diameter of 0.1 mm (high purity alumina beads manufactured by TAIMEI CHEMICALS CO., LTD.) were added. The mixture was fed to a wet crusher (a batch desktop sand mill manufactured by Kanpe Hapio Co., Ltd.), and the calcined powder was subjected to a crushing and dispersing treatment for 180 minutes. Thereafter, the alumina beads were separated and removed with a stainless steel filter having an opening size of 44 μm. The dispersion was then mixed with 6.65 kg of pure water and the mixture was stirred to give 8.84 kg of an aqueous dispersion of the zirconium-based composite oxide fine particles (core particles). The solid content in the aqueous dispersion was 11 wt %.

The aqueous dispersion was then washed with ion exchange water through an ultrafiltration membrane. Thereafter, 0.43 kg of an anion exchange resin (SANUPC manufactured by Mitsubishi Chemical Corporation) was added to deionize the dispersion. The dispersion was treated with a centrifuge (CR-21G manufactured by Hitachi Koki Co., Ltd.) at 12,000 rpm for 1 hour, thus giving 9.50 kg of an aqueous dispersion (C-2) of the zirconium-based composite oxide fine particles (core particles) that had a solid concentration in terms of $ZrO_2$ of 10 wt %. The core particles contained in the aqueous dispersion had an average particle diameter of 28 nm.

Further, the contents of metal components in the core particles were measured in terms of metal oxides, resulting in 98.5 wt % $ZrO_2$ and 1.5 wt % $K_2O$.

(Preparation of Core-Shell Inorganic Oxide Fine Particles)

Commercial water glass (manufactured by AGC Si-Tech Co., Ltd., JIS No. 3 water glass, $SiO_2$ concentration 24 mass %) was diluted with pure water and was dealkalized with a cation exchange resin (manufactured by Mitsubishi Chemical Corporation). Thus, an aqueous silicic acid solution containing 4.5 wt % in terms of $SiO_2$ of silicic acid liquid and having a pH of 2.3 was obtained.

Next, 3.0 kg of the aqueous dispersion (C-2) of the zirconium-based composite oxide fine particles (core particles) obtained in the aforementioned step was dealkalized with 0.3 kg of a cation exchange resin (manufactured by Mitsubishi Chemical Corporation). The resin was separated, thus obtaining an aqueous dispersion sol. While performing stirring, 100.0 g of the aqueous silicic acid solution was gradually added to the aqueous dispersion sol. After the completion of the addition, the mixture was aged for 1 hour at a constant temperature of 35° C. while performing stirring. Thus, an aqueous dispersion was obtained.

A 10.0 wt % aqueous sodium hydroxide solution was added to the aqueous dispersion to adjust the pH to 10.0. While performing stirring and maintaining the temperature at 85° C., the dispersion was aged for 1 hour. Thus, an aqueous dispersion (CW-2) was prepared which contained core-shell inorganic oxide fine particles including the zirconium-based composite oxide fine particles (core particles) whose surface had been coated with silica.

While performing stirring, 204 g of a cation exchange resin was added to 2000 g of the aqueous dispersion (CW-2) of the core-shell inorganic oxide fine particles obtained in the above step. After the mixture was stirred for 1 hour at room temperature, the resin was separated. Water that was the dispersion solvent of the aqueous dispersion was replaced by methanol (manufactured by HAYASHI PURE CHEMICAL IND., LTD., methyl alcohol concentration: 99.9 wt %) with use of an ultrafiltration membrane apparatus (filtration membrane SIP-1013 manufactured by Asahi Kasei Corporation).

The methanol dispersion of the core-shell inorganic oxide fine particles (hereinafter "CM-2") had a water content of about 0.5 wt % and a solid concentration of 10 wt %. The core-shell inorganic oxide fine particles present in the methanol dispersion had an average particle diameter of 29 nm and a BET specific surface area of 92 m$^2$/g.

Preparation (4) of Oligomer-Modified Inorganic Oxide Fine Particles

A methanol dispersion (CP-4) of oligomer-modified inorganic oxide fine particles was obtained in the same manner as described in Step (1) and Step (2) in "Preparation (1) of oligomer-modified inorganic oxide fine particles" in Example 1, except that Step (2) in "Preparation (1) of oligomer-modified inorganic oxide fine particles" in Example 1 involved 1.5 kg of the methanol dispersion (CM-2) of the core-shell inorganic oxide fine particles prepared in this Example instead of 1.5 kg of the methanol dispersion (CM-1) of the core-shell inorganic oxide fine particles prepared in Example 1.

The oligomer-modified inorganic oxide fine particles had an average particle diameter of 30 nm according to a dynamic light scattering method. The methanol dispersion of the oligomer-modified inorganic oxide fine particles had a pH of 4.5 and a viscosity of 3.3 mPa·s. Further, the solid concentration of the oligomer-modified inorganic oxide fine particles and the unit viscosity were 30.5 wt % and 0.11 mPa·s/(wt %).

Preparation of Hardcoat Layer-Forming Coating Composition (H4)

While performing stirring, 55.5 g of a 0.01 N aqueous hydrochloric acid solution was dropped to a mixture liquid including 162.7 g of γ-glycidoxypropyltrimethoxysilane (Z-6040 manufactured by Dow Corning Toray Co., Ltd.) and 28.8 g of methanol (manufactured by HAYASHI PURE CHEMICAL IND., LTD., methyl alcohol concentration: 99.9 wt %). The resultant mixture liquid was stirred at room temperature for a whole day and night to hydrolyze the silane compound.

Subsequently, the vessel containing the hydrolysis liquid was charged with 254.6 g of methanol (manufactured by HAYASHI PURE CHEMICAL IND., LTD., methyl alcohol concentration: 99.9 wt %), 450.0 g of the 30.5 wt % methanol dispersion (CP-4) of the oligomer-modified inorganic oxide fine particles prepared in this Example, 40.6 g of propylene glycol monomethyl ether (manufactured by The Dow Chemical Company), 6.5 g of tris(2,4-pentanedionato)aluminum III (manufactured by TOKYO CHEMICAL INDUSTRY CO., LTD.), and 1.1 g of a silicone surfactant (L-7604 manufactured by Dow Corning Toray Co., Ltd.) serving as a leveling agent. The resultant mixture was stirred at room temperature for a whole day and night to give a hardcoat layer-forming coating composition (H4).

Example 5

Preparation (3) of Inorganic Oxide Fine Particles (Preparation of Core Particles)

12.1 kg of an aqueous titanium tetrachloride solution containing 7.75 wt % in terms of TiO$_2$ of titanium tetrachloride (manufactured by OSAKA Titanium technologies Co., Ltd.) was mixed with 4.7 kg of ammonia water containing 15 wt % of ammonia (manufactured by UBE INDUSTRIES, LTD.) to give a white slurry having a pH of 9.5. The slurry was then filtered and was washed with pure water to afford 9.9 kg of a hydrous titanic acid cake having a solid content of 10 wt %.

Next, the cake was mixed with 11.3 kg of a hydrogen peroxide solution containing 35 wt % of hydrogen peroxide (manufactured by MITSUBISHI GAS CHEMICAL COMPANY, INC.) and with 20.0 kg of pure water. The mixture was heated at 80° C. for 1 hour while performing stirring, and 57.52 kg of pure water was added. Thus, 98.7 kg of an aqueous peroxytitanic acid solution containing 1 wt % in terms of TiO$_2$ of peroxytitanic acid was obtained. The aqueous peroxytitanic acid solution was transparent yellow-brown and had a pH of 8.5.

Subsequently, 98.7 kg of the aqueous peroxytitanic acid solution was mixed with 4.7 kg of a cation exchange resin (manufactured by Mitsubishi Chemical Corporation). To the mixture, 12.3 kg of an aqueous potassium stannate solution containing 1 wt % in terms of SnO$_2$ of potassium stannate (manufactured by SHOWA KAKO CORPORATION) was gradually added while performing stirring.

The cation exchange resin which had captured ions such as potassium ions was separated. Thereafter, the liquid was heated in an autoclave (manufactured by Taiatsu Techno Corporation, 120 L) at 165° C. for 18 hours.

The resultant aqueous mixture solution was cooled to room temperature and was concentrated with an ultrafiltration membrane apparatus (ACV-3010 manufactured by Asahi Kasei Corporation) to give 9.9 kg of an aqueous mixture solution having a solid content of 10 wt %.

The solid contained in the aqueous mixture solution was identified by the aforementioned method to be titanium- and tin-containing composite oxide fine particles (titanium-based fine particles) having a rutile crystal structure. Further, the contents of metal components in the titanium-based fine particles were measured in terms of metal oxides, resulting in 87.2 wt % TiO$_2$, 11.0 wt % SnO$_2$ and 1.8 wt % K$_2$O. The pH of the aqueous mixture solution was 10.0.

Next, 9.00 kg of the aqueous mixture solution containing the titanium-based fine particles was spray dried by being sprayed into a spray dryer (NIRO ATOMIZER manufactured by NIRO) (entrance temperature: 260° C., exit temperature: 55° C.). As a result, 0.63 kg of a dry powder was obtained which was composed of the composite oxide particles with an average particle diameter of about 2 μm.

Next, the 0.63 kg dry powder of the titanium-based fine particles obtained above was calcined at 700° C. for 1 hour in an air atmosphere to give 0.59 kg of a calcined powder of the titanium-based fine particles.

The calcined powder of the titanium-based fine particles weighing 0.17 kg was dispersed in 250.4 g of pure water. To the dispersion, 24.8 g of a 10 wt % aqueous potassium hydroxide solution was added to adjust the pH to 11.0.

Thereafter, 1.27 kg of alumina beads having a particle diameter of 0.1 mm (high purity alumina beads manufactured by TAIMEI CHEMICALS CO., LTD.) were added to the aqueous mixture solution. The mixture was fed to a wet crusher (a batch desktop sand mill manufactured by Kanpe Hapio Co., Ltd.), and the titanium-based fine particles were crushed for 180 minutes. Thereafter, the aluminum beads were separated and removed with a stainless steel filter having an opening size of 44 μM. The liquid was then mixed with 840.0 g of pure water and the mixture was stirred to give 1.17 kg of an aqueous dispersion sol having a solid content of 11 wt %.

The aqueous dispersion sol of the titanium-based fine particles obtained through the above crushing treatment had a milky white appearance. The average particle diameter of the titanium-based fine particles in the aqueous dispersion sol was 106 nm. The distribution frequency of coarse particles with 100 nm or larger particle diameters was 59.1%.

Next, 1.17 kg of the aqueous dispersion sol was mixed with 0.12 kg of pure water to give an aqueous dispersion sol having a solid concentration of 10 wt %. Further, 0.29 kg of an anion exchange resin (manufactured by Mitsubishi Chemical Corporation) was added, and the mixture was stirred for 15 minutes. The anion exchange resin was separated and removed with a stainless steel filter having an opening size of 44 µm. Thereafter, 39.4 g of a cation exchange resin (manufactured by Mitsubishi Chemical Corporation) was added, and the mixture was stirred for 15 minutes. The cation exchange resin was separated and removed with a stainless steel filter having an opening size of 44 µm. The aqueous dispersion sol was then treated with a centrifuge (CR-21G manufactured by Hitachi Koki Co., Ltd.) at 12,000 rpm for 1 hour, thereby classifying and removing the coarse particles with 100 nm or larger particle diameters. In this manner, 1.13 kg of an aqueous dispersion sol having a solid content of 6.4 wt % was obtained.

Next, 1.13 kg of the aqueous dispersion sol (solid content 6.4 wt %) was mixed with 2.49 kg of pure water to give 3.62 kg of an aqueous dispersion sol having a solid content of 2.0 wt %. The aqueous dispersion sol was then heat treated in an autoclave (manufactured by Taiatsu Techno Corporation, 5 L) at 165° C. for 18 hours.

The aqueous dispersion sol was removed from the autoclave and was cooled to room temperature, and 0.14 kg of an anion exchange resin (manufactured by Mitsubishi Chemical Corporation) was added. The mixture was stirred for 15 minutes. The anion exchange resin was separated and removed with a stainless steel filter having an opening size of 44 µm. Thereafter, 9.5 g of a cation exchange resin (manufactured by Mitsubishi Chemical Corporation) was added, and the mixture was stirred for 15 minutes. The cation exchange resin was separated and removed with a stainless steel filter having an opening size of 44 µm. Thus, 3.52 kg of a deionized aqueous dispersion (C-3) was obtained which contained the titanium-based fine particles (core particles) with a solid content of 2.0 wt %.

The above procedures were repeated four times, thereby obtaining 17.6 kg of the aqueous dispersion (C-3) of the titanium-based fine particles (core particles) which had a solid content of 2.0 wt %.

(Preparation of Core-Shell Inorganic Oxide Fine Particles)

An aqueous dispersion (CW-3) of core-shell inorganic oxide fine particles and a methanol dispersion (CM-3) of core-shell fine particles were obtained in the same manner as described in (Preparation of core-shell particles) in Example 1, except that the steps in (Preparation of core-shell fine particles) described in Example 1 involved 15.0 kg of the aqueous dispersion (C-3) of the titanium-based fine particles (core particles) prepared in this Example instead of 3.0 kg of the aqueous dispersion (C-1) of the titanium-based composite oxide fine particles (core particles) prepared in Example 1.

The core-shell inorganic oxide fine particles had an average particle diameter of 25 nm according to a dynamic light scattering method, and a BET specific surface area of 82 $m^2/g$.

Preparation (5) of Oligomer-Modified Inorganic Oxide Fine Particles

A methanol dispersion (CP-5) of oligomer-modified inorganic oxide fine particles was obtained in the same manner as described in Step (1) and Step (2) in "Preparation (1) of oligomer-modified inorganic oxide fine particles" in Example 1, except that Step (2) in "Preparation (1) of oligomer-modified inorganic oxide fine particles" in Example 1 involved 1.5 kg of the methanol dispersion (CM-3) of the core-shell inorganic oxide fine particles prepared in this Example instead of 1.5 kg of the methanol dispersion (CM-1) of the core-shell inorganic oxide fine particles prepared in Example 1.

The oligomer-modified inorganic oxide fine particles had an average particle diameter of 23 nm according to a dynamic light scattering method. The methanol dispersion of the oligomer-modified inorganic oxide fine particles had a pH of 4.5 and a viscosity of 3.3 mPa·s. Further, the methanol dispersion of the oligomer-modified inorganic oxide fine particles had a solid concentration and a unit viscosity of 30.5 wt % and 0.11 mPa·s/(wt %).

Preparation of Hardcoat Layer-Forming Coating Composition (H5)

While performing stirring, 56.3 g of a 0.01 N aqueous hydrochloric acid solution was dropped to a mixture liquid including 165.3 g of γ-glycidoxypropyltrimethoxysilane (Z-6040 manufactured by Dow Corning Toray Co., Ltd.) and 29.3 g of methanol (manufactured by HAYASHI PURE CHEMICAL IND., LTD., methyl alcohol concentration: 99.9 wt %). The resultant mixture liquid was stirred at room temperature for a whole day and night to hydrolyze the silane compound.

Subsequently, the vessel containing the hydrolysis liquid was charged with 259.0 g of methanol (manufactured by HAYASHI PURE CHEMICAL IND., LTD., methyl alcohol concentration: 99.9 wt %), 441.8 g of the 30.5 wt % methanol dispersion (CP-5) of the oligomer-modified inorganic oxide fine particles prepared in this Example, 40.6 g of propylene glycol monomethyl ether (manufactured by The Dow Chemical Company), 7.1 g of tris(2,4-pentanedionato)aluminum III (manufactured by TOKYO CHEMICAL INDUSTRY CO., LTD.), and 1.1 g of a silicone surfactant (L-7604 manufactured by Dow Corning Toray Co., Ltd.) serving as a leveling agent. The resultant mixture was stirred at room temperature for a whole day and night to give a hardcoat layer-forming coating composition (H5).

Preparation of Primer Layer-Forming Coating Composition (P2)

A vessel was provided which contained 161.0 g of a commercial thermoplastic resin, namely, polyurethane emulsion "SUPER FLEX 150" (manufactured by DAI-ICHI KOGYO SEIYAKU CO., LTD., water-dispersed urethane elastomer solid content: 30%). The vessel was charged with 205.9 g of the methanol dispersion (CP-5) of the oligomer-modified inorganic oxide fine particles prepared in this Example and 97.1 g of ion exchange water. The mixture was stirred for 1 hour.

Next, the resultant mixture liquid was mixed with 535.7 g of methanol (manufactured by HAYASHI PURE CHEMICAL IND., LTD., methyl alcohol concentration: 99.9 wt %) and 0.3 g of a silicone surfactant (L-7604 manufactured by Dow Corning Toray Co., Ltd.) serving as a leveling agent.

The mixture was stirred at room temperature for a whole day and night to give a primer layer-forming coating composition (P2).

Comparative Example 1

Preparation of Fine Particles Surface-Treated with Silane-Coupling Agent

While performing stirring, 53 g of a cation exchange resin was added to 2000 g of the aqueous dispersion (CW-1) of the core-shell inorganic oxide fine particles prepared in Example 1. The mixture was stirred for 1 hour at room temperature, and the ion exchange resin was separated. The obtained aqueous dispersion was mixed with 2.0 kg of methanol (manufactured by HAYASHI PURE CHEMICAL IND., LTD., methyl alcohol concentration: 99.9 wt %). Further, 38.5 g of tetraethyl orthosilicate containing 28 wt % in terms of $SiO_2$ of a silicon component (manufactured by TAMA CHEMICALS CO., LTD.) was dropped to the mixture liquid. The resultant mixture solution was heated to 50° C. and was stirred for 18 hours. A mixture solution was separately prepared by mixing 38.5 g of tetraethyl orthosilicate with 1800 g of water and 2 kg of methanol followed by heating at 50° C. for 18 hours. The molecular weight of the component derived from the silane-coupling agent was found to be 192, and the polymerization degree was determined to be 1.4 assuming that the molecular weight of the repeating unit was 134 (structural formula {—SiO $(OC_2H_5)_2$—}). Based on these facts, similar polymerization degree and molecular weight were estimated for the silane-coupling agent that was used as the surface modifier for the particles.

The obtained mixture solution was cooled to room temperature, and the dispersion medium was changed from methanol to water with use of an ultrafiltration membrane (SIP-1013 manufactured by Asahi Kasei Corporation). Further, the solid content was concentrated to 30.5 wt %. Thus, 650.0 g of a methanol dispersion (CL-1) was obtained which contained the core-shell inorganic oxide fine particles that had been surface treated with a hydrolyzate condensate of tetraethyl orthosilicate.

The surface-treated core-shell inorganic oxide fine particles had an average particle diameter of 21 nm according to a dynamic light scattering method. The methanol dispersion had a pH of 4.4 and a viscosity of 1.4 mPa·s. Further, the methanol dispersion had a solid concentration and a unit viscosity of 30.5 wt % and 0.05 mPa·s/(wt %).

Preparation of Hardcoat Layer-Forming Coating Composition (Y1)

While performing stirring, 75.8 g of a 0.01 N aqueous hydrochloric acid solution was dropped to a mixture liquid including 222.5 g of γ-glycidoxypropyltrimethoxysilane (Z-6040 manufactured by Dow Corning Toray Co., Ltd.) and 39.4 g of methanol (manufactured by HAYASHI PURE CHEMICAL IND., LTD., methyl alcohol concentration: 99.9 wt %). The resultant mixture liquid was stirred at room temperature for a whole day and night to hydrolyze the silane compound.

Subsequently, the vessel containing the hydrolysis liquid was charged with 357.5 g of methanol (manufactured by HAYASHI PURE CHEMICAL IND., LTD., methyl alcohol concentration: 99.9 wt %), 254.2 g of the 30.5 wt % methanol dispersion (CL-1) of the surface-treated core-shell inorganic oxide fine particles prepared in this Comparative Example, 40.6 g of propylene glycol monomethyl ether (manufactured by The Dow Chemical Company), 7.1 g of tris(2,4-pentanedionato)aluminum III (manufactured by TOKYO CHEMICAL INDUSTRY CO., LTD.), and 1.1 g of a silicone surfactant (L-7604 manufactured by Dow Corning Toray Co., Ltd.) serving as a leveling agent. The resultant mixture was stirred at room temperature for a whole day and night to give a hardcoat layer-forming coating composition (Y1).

Preparation of Hardcoat Layer-Forming Coating Composition (Y2)

While performing stirring, 57.1 g of a 0.01 N aqueous hydrochloric acid solution was dropped to a mixture liquid including 167.4 g of γ-glycidoxypropyltrimethoxysilane (Z-6040 manufactured by Dow Corning Toray Co., Ltd.) and 29.6 g of methanol (manufactured by HAYASHI PURE CHEMICAL IND., LTD., methyl alcohol concentration: 99.9 wt %). The resultant mixture liquid was stirred at room temperature for a whole day and night to hydrolyze the silane compound.

Subsequently, the vessel containing the hydrolysis liquid was charged with 262.7 g of methanol (manufactured by HAYASHI PURE CHEMICAL IND., LTD., methyl alcohol concentration: 99.9 wt %), 434.7 g of the 30.5 wt % methanol dispersion (CL-1) of the surface-treated core-shell inorganic oxide fine particles prepared in this Comparative Example, 40.6 g of propylene glycol monomethyl ether (manufactured by The Dow Chemical Company), 7.1 g of tris(2,4-pentanedionato)aluminum III (manufactured by TOKYO CHEMICAL INDUSTRY CO., LTD.), and 1.1 g of a silicone surfactant (L-7604 manufactured by Dow Corning Toray Co., Ltd.) serving as a leveling agent. The resultant mixture was stirred at room temperature for a whole day and night to give a hardcoat layer-forming coating composition (Y2).

Preparation of Primer Layer-Forming Coating Composition (Z1)

A vessel was provided which contained 217.8 g of a commercial thermoplastic resin, namely, polyurethane emulsion "SUPER FLEX 150" (manufactured by DAI-ICHI KOGYO SEIYAKU CO., LTD., water-dispersed urethane elastomer solid content: 30%). The vessel was charged with 150.0 g of the methanol dispersion (CL-1) of the surface-treated core-shell inorganic oxide fine particles prepared in this Comparative Example and 97.1 g of ion exchange water. The mixture was stirred for 1 hour.

Next, the resultant mixture liquid was added with 534.8 g of methanol (manufactured by HAYASHI PURE CHEMICAL IND., LTD., methyl alcohol concentration: 99.9 wt %) and 0.3 g of a silicone surfactant (L-7604 manufactured by Dow Corning Toray Co., Ltd.) serving as a leveling agent. The mixture was stirred at room temperature for a whole day and night to give a primer layer-forming coating composition (Z1).

Preparation of Primer Layer-Forming Coating Composition (Z2)

A vessel was provided which contained 161.0 g of a commercial thermoplastic resin, namely, polyurethane emulsion "SUPER FLEX 150" (manufactured by DAI-ICHI KOGYO SEIYAKU CO., LTD., water-dispersed urethane elastomer solid content: 30%). The vessel was charged with 205.9 g of the methanol dispersion (CL-1) of the surface-treated core-shell inorganic oxide fine particles prepared in this Comparative Example and 97.1 g of ion exchange water. The mixture was stirred for 1 hour.

Next, the resultant mixture liquid was mixed with 535.7 g of methanol (manufactured by HAYASHI PURE CHEMICAL IND., LTD., methyl alcohol concentration: 99.9 wt %) and 0.3 g of a silicone surfactant (L-7604 manufactured by Dow Corning Toray Co., Ltd.) serving as a leveling agent. The mixture was stirred at room temperature for a whole day and night to give a primer layer-forming coating composition (Z2).

Comparative Example 2

Preparation of Oligomer-Modified Inorganic Oxide Fine Particles

Step (1)
Preparation (4) of Oligomer-Containing Mixture Solution

An oligomer-containing mixture solution (L-1) was obtained in the same manner as described in Step (1) in "Preparation (1) of oligomer-containing mixture solution" in Example 1, except that the mixture liquid of the methyl polysilicate, the modified alcohol and the aqueous hydrochloric acid solution prepared in "Preparation (1) of oligomer-containing mixture solution" in Example 1 was heated in the autoclave at 100° C. for 48 hours instead of being heated at 100° C. for 60 minutes.

The mixture solution obtained had a solid content of 10.0 wt % and a pH of 3.2. The molecular weight of the oligomer contained in the mixture solution was 23000, and the polymerization degree was 217.0 assuming that the mass of the repeating unit was 106.

Step 2

A methanol dispersion (CL-2) of oligomer-modified inorganic oxide fine particles was obtained in the same manner as described in Step (2) in "Preparation (1) of oligomer-modified inorganic oxide fine particles" in Example 1, except that Step (2) in "Preparation (1) of oligomer-modified inorganic oxide fine particles" described in Example 1 involved 0.5 kg of the mixture solution (L-1) prepared in this Comparative Example instead of 0.5 kg of the mixture solution (P-1) prepared in Example 1.

Here, the inorganic oxide fine particles in the oligomer-modified inorganic oxide fine particles were the core-shell inorganic oxide fine particles prepared in Example 1.

The oligomer-modified fine particles had an average particle diameter of 46 nm according to a dynamic light scattering method. The dispersion of the oligomer-modified fine particles had a pH of 4.6 and a viscosity of 40.8 mPa·s. Further, the solid concentration of the oligomer-modified fine particles was 30.5%, and the unit viscosity was 1.34 mPa·s/(wt %).

Preparation of Hardcoat Layer-Forming Coating Composition (Y3)

While performing stirring, 60.43 g of a 0.01 N aqueous hydrochloric acid solution was dropped to a mixture liquid including 177.3 g of γ-glycidoxypropyltrimethoxysilane (Z-6040 manufactured by Dow Corning Toray Co., Ltd.) and 31.4 g of methanol (manufactured by HAYASHI PURE CHEMICAL IND., LTD., methyl alcohol concentration: 99.9 wt %). The resultant mixture liquid was stirred at room temperature for a whole day and night to hydrolyze the silane compound.

Subsequently, the vessel containing the hydrolysis liquid was charged with 279.9 g of methanol (manufactured by HAYASHI PURE CHEMICAL IND., LTD., methyl alcohol concentration: 99.9 wt %), 402.1 g of the 30.5 wt % methanol dispersion (CL-2) of the oligomer-modified fine particles prepared in this Comparative Example, 40.6 g of propylene glycol monomethyl ether (manufactured by The Dow Chemical Company), 7.1 g of tris(2,4-pentanedionato) aluminum III (manufactured by TOKYO CHEMICAL INDUSTRY CO., LTD.), and 1.1 g of a silicone surfactant (L-7604 manufactured by Dow Corning Toray Co., Ltd.) serving as a leveling agent. The resultant mixture was stirred at room temperature for a whole day and night to give a hardcoat layer-forming coating composition (Y3).

Preparation of Primer Layer-Forming Coating Composition (Z3)

A vessel was provided which contained 161.0 g of a commercial thermoplastic resin, namely, polyurethane emulsion "SUPER FLEX 150" (manufactured by DAI-ICHI KOGYO SEIYAKU CO., LTD., water-dispersed urethane elastomer solid content: 300). The vessel was charged with 205.9 g of the methanol dispersion (CL-2) of the oligomer-modified fine particles prepared in this Comparative Example and 97.1 g of ion exchange water. The mixture was stirred for 1 hour.

Next, the resultant mixture liquid was mixed with 535.7 g of methanol (manufactured by HAYASHI PURE CHEMICAL IND., LTD., methyl alcohol concentration: 99.9 wt %) and 0.3 g of a silicone surfactant (L-7604 manufactured by Dow Corning Toray Co., Ltd.) serving as a leveling agent. The mixture was stirred at room temperature for a whole day and night to give a primer layer-forming coating composition (Z3).

Table 1 describes properties of the particles prepared in Examples 1 to 5 and Comparative Examples 1 and 2.

Fabrication of Plastic Lens Substrate Samples (Test Pieces)

(1) Pretreatment of Plastic Lens Substrates

Commercial plastic lens substrates "monomer name: MR-8" (manufactured by Mitsui Chemicals, Inc., refractive index of substrate: 1.60) and "monomer name: MR-7" (manufactured by Mitsui Chemicals, Inc., refractive index of substrate: 1.67) were etched by being soaked for 2 minutes in an aqueous KOH solution having a concentration of 10 wt % that had been maintained at 40° C. Further, the substrates were collected, washed with water and sufficiently dried.

(2) Formation of Primer Layers

The primer layer-forming coating compositions were applied to the pretreated plastic lens substrates, thereby forming films. The application of the coating compositions involved a dipping method (pick up speed: 120 mm/min).

Subsequently, the films were heat treated at 100° C. for 10 minutes to preliminarily dry the films (the primer layers).

The primer layers formed by the preliminary curing as described above generally had a film thickness of 0.5 to 0.7 μm.

(3) Formation of Hardcoat Layers

The hardcoat layer-forming coating compositions were each applied to the surface of the pretreated plastic lens substrate or the primer-coated plastic lens substrate to form a film. The application of the coating compositions involved a dipping method (pick up speed: 250 mm/min).

Subsequently, the film was dried at 90° C. for 10 minutes and was heat treated at 110° C. for 2 hours, thereby curing the film (the hardcoat layer). During this process, the primer layer was also cured at the same time.

The hardcoat layers formed by the above curing generally had a film thickness of 3.0 to 3.5 μm.

(4) Formation of Antireflection Layers

The inorganic oxide components described below were deposited by a vacuum deposition method onto the surface of the hardcoat layer. Thus, an antireflection layer was formed in which $SiO_2$: 0.06λ, $ZrO_2$: 0.15λ, $SiO_2$: 0.04λ, $ZrO_2$: 0.25λ, and $SiO_2$: 0.25λ were stacked on top of one another in this order from the hardcoat layer side toward the atmosphere side. The design wavelength λ was 520 nm.

Evaluation of Appearance, Abrasion Resistance, Adhesion and Weather Resistance

According to the combinations shown in Table 2, the hardcoat layer-forming coating compositions H1, H2, H3, H4, H5, Y1, Y2 and Y3, and the primer layer-forming coating compositions P1, P2, Z1 and Z2 obtained in Examples 1 to 5 and Comparative Examples 1 and 2, were applied onto the pretreated plastic lens substrates to form primer layers and hardcoat layers. Thus, test pieces 1 to 9 were fabricated.

The test piece 7 was fabricated by coating the substrate with the primer layer-forming coating composition P1, the hardcoat layer-forming coating composition H1, and by forming the antireflection layer. Further, the test piece 8 was composed of the substrate coated with the primer layer-forming coating composition P2, the hardcoat layer-forming coating composition H5, and by forming the antireflection layer; the test piece 9 was composed of the substrate coated with the primer layer-forming coating composition Z2, the hardcoat layer-forming coating composition Y2, and the antireflection layer; and the substrates of these test pieces were "monomer name: MR-7" (manufactured by Mitsui Chemicals, Inc., refractive index of substrate: 1.67). The substrates of the other test pieces were "monomer name: MR-8" (manufactured by Mitsui Chemicals, Inc., refractive index of substrate: 1.60).

The test pieces 1 to 9 were tested in accordance with the aforementioned evaluation test methods to evaluate appearance (interference fringes), appearance (cloudiness), abrasion resistance, film hardness, adhesion, weather resistance and light resistance. The results are described in Table 3.

The results show that the test pieces obtained by applying the coating compositions from Examples achieved relatively high abrasion resistance and film hardness and also exhibited high transparency without cloudiness. Further, these test pieces were demonstrated to have excellent adhesion and high weather resistance and light resistance.

TABLE 1

Properties of dispersions of oligomer-modified inorganic oxide fine particles

| | Metals of core particles | Metals of shell layer | Metals of oligomer | Molecular weight of oligomer | Polymerization degree of oligomer | Viscosity (mPa·s) | Solid content (%) | Unit viscosity (mPa·s/%) |
|---|---|---|---|---|---|---|---|---|
| Ex. 1 | Ti—Sn—Si—K | Si—Zr | Si | 3600 | 34.0 | 3.3 | 30.5 | 0.11 |
| Ex. 2 | Ti—Sn—Si—K | Si—Zr | Si—Zr | 5000 | 40.5 | 3.3 | 30.5 | 0.11 |
| Ex. 3 | Ti—Sn—Si—K | Si—Zr | Si | 9000 | 84.9 | 3.5 | 30.5 | 0.11 |
| Ex. 4 | Zr—K | Si | Si | 3600 | 34.0 | 3.3 | 30.5 | 0.11 |
| Ex. 5 | Ti—Sn—K | Si—Zr | Si | 3600 | 34.0 | 3.3 | 30.5 | 0.11 |
| Comp. Ex. 1 | Ti—Sn—Si—K | Si—Zr | Si | 192 | 1.4 | 1.4 | 30.5 | 0.05 |
| Comp. Ex. 2 | Ti—Sn—Si—K | Si—Zr | Si | 23000 | 217.0 | 40.8 | 30.5 | 1.34 |

TABLE 2

Configuration of test pieces

| | | Hardcoat coating | | Primer coating | | |
|---|---|---|---|---|---|---|
| Test piece Nos. | Refractive index of substrate | Inventive coating | Comparative coating | Inventive coating | Comparative coating | Antireflection layer |
| 1 | 1.60 | H1 | — | P1 | — | Absent |
| 2 | 1.60 | H2 | — | P1 | — | Absent |
| 3 | 1.60 | H3 | — | P1 | — | Absent |
| 4 | 1.60 | H4 | — | P1 | — | Absent |
| 5 | 1.60 | — | Y1 | — | Z1 | Absent |
| 6 | 1.60 | — | Y3 | — | Z1 | Absent |
| 7 | 1.60 | H1 | — | P1 | — | Present |
| 8 | 1.67 | H5 | — | P2 | — | Present |
| 9 | 1.67 | — | Y2 | — | Z2 | Present |

TABLE 3

Results of evaluation of test pieces

Properties of films

| Test piece Nos. | Appearance (interference fringes) | Appearance (cloudiness) | Abrasion resistance | Film hardness | Adhesion | Weather resistant adhesion | Light resistance |
|---|---|---|---|---|---|---|---|
| 1 | S | A | B | 7.4 | Good | Good | ○ |
| 2 | S | A | B | 6.2 | Good | Good | ○ |
| 3 | S | A | B | 7.3 | Good | Good | ○ |
| 4 | A | A | B | 7.1 | Good | Good | ○ |
| 5 | A | A | C | 5.4 | Good | Poor | Δ |
| 6 | C | C | D | 3.8 | Good | Poor | Δ |
| 7 | S | A | A | 13.5 | Good | Good | ○ |
| 8 | A | A | A | 13.3 | Good | Good | ○ |
| 9 | A | A | B | 9.8 | Good | Poor | Δ |

The invention claimed is:

1. Linear oligomer-modified inorganic oxide fine particles comprising inorganic oxide fine particles having a surface modified with a linear oligomer, the linear oligomer being derived from a metal alkoxide, wherein each metal alkoxide is independently selected from the group consisting of metal alkoxide represented by Formula (1):

$$R_nM_1(OR')_{z-n} \qquad (1)$$

wherein $M_1$: one or more elements selected from Si, Ti, Zr and Al;
R and R': one or more groups selected from alkyl groups of 1 to 8 carbon atoms, aryl groups and vinyl groups;
n: an integer of 2 when z=4, an integer of 1 when z=3; and
z: the valence of $M_1$ (z=3, 4);
the linear oligomer having a polymerization degree of 3 or more, the linear oligomer having a weight average molecular weight in the range of 3000 to 9000,
the linear oligomer-modified inorganic oxide fine particles having an average particle diameter in the range of 9 to 65 nm.

2. The oligomer-modified inorganic oxide fine particles according to claim 1, wherein the oligomer is a polycondensate of a hydrolyzate and/or a partial hydrolyzate of the metal alkoxide, or a mixture of the polymers.

3. The oligomer-modified inorganic oxide fine particles according to claim 1, wherein $M_1$ is Si.

4. The oligomer-modified inorganic oxide fine particles according to claim 1, wherein the inorganic oxide fine particles are oxide fine particles or composite oxide fine particles including one or more metal elements selected from titanium, zirconium, tin, niobium, tungsten, antimony, indium and aluminum.

5. The oligomer-modified inorganic oxide fine particles according to claim 1, which have a unit viscosity in the range of 0.07 to 0.65 mPa·s/(wt %), the unit viscosity being obtained by dividing the viscosity of a methanol dispersion of the oligomer-modified inorganic oxide fine particles in methanol by the solid concentration of the dispersion.

6. The oligomer-modified inorganic oxide fine particles according to claim 1, wherein the weight (A) of oligomeric modifier has a ratio to the weight (B) of the inorganic oxide fine particles in the range of (A)/(B)=0.05 to 5.0.

7. A dispersion comprising the oligomer-modified inorganic oxide fine particles described in claim 1.

8. A coating comprising the oligomer-modified inorganic oxide fine particles described in claim 1, and a matrix component.

9. A method for producing oligomer-modified inorganic oxide fine particles having a surface modified with the oligomer of claim 1, the method comprising the following Steps (1) and (2):

Step (1)
an acid catalyst and water are added to a metal alkoxide (or a mixture of metal alkoxides having different $M_1$, R, R' and n) and/or a hydrolyzate thereof, the metal alkoxide being represented by Formula (1):

$$R_nM_1(OR')_{z-n} \qquad (1)$$

wherein $M_1$: one or more elements selected from Si, Ti, Zr and Al;
R and R': one or more groups selected from alkyl groups of 1 to 8 carbon atoms, aryl groups and vinyl groups;
n: an integer of 2 when z=4, an integer of 1 when z=3; and
z: the valence of $M_1$ (z=3, 4); and the resultant mixture solution is subjected to hydrolysis and polycondensation at 60 to 120° C. for 20 minutes to 24 hours to form a mixture solution including a linear metal alkoxide oligomer;

Step (2)
the acid catalyst is removed from the mixture solution including the linear metal alkoxide oligomer produced in Step (1), inorganic oxide fine particles including one or more metal elements selected from titanium, zirconium, tin, niobium, tungsten, antimony, indium and aluminum are added to the mixture solution, and the resultant mixture is treated at 5 to 30° C. for 0.5 to 24 hours to allow the metal alkoxide oligomer to react with the surface of the inorganic oxide fine particles.

10. The method for producing oligomer-modified inorganic oxide fine particles according to claim 9, wherein the hydrolysis of the metal alkoxide in Step (1) takes place with a pH of the mixture solution in the range of 2 to 4.

11. The oligomer-modified inorganic oxide fine particles according to claim 2, wherein $M_1$ is Si.

12. The oligomer-modified inorganic oxide fine particles according to claim 2, wherein the inorganic oxide fine particles are oxide fine particles or composite oxide fine particles including one or more metal elements selected from titanium, zirconium, tin, niobium, tungsten, antimony, indium and aluminum.

13. The oligomer-modified inorganic oxide fine particles according to claim 3, wherein the inorganic oxide fine particles are oxide fine particles or composite oxide fine particles including one or more metal elements selected from titanium, zirconium, tin, niobium, tungsten, antimony, indium and aluminum.

14. The oligomer-modified inorganic oxide fine particles according to claim 2, which have a unit viscosity in the range of 0.07 to 0.65 mPa·s/(wt %), the unit viscosity being obtained by dividing the viscosity of a methanol dispersion of the oligomer-modified inorganic oxide fine particles in methanol by the solid concentration of the aqueous dispersion.

15. The oligomer-modified inorganic oxide fine particles according to claim 3, which have a unit viscosity in the range of 0.07 to 0.65 mPa·s/(wt %), the unit viscosity being obtained by dividing the viscosity of a methanol dispersion of the oligomer-modified inorganic oxide fine particles in methanol by the solid concentration of the aqueous dispersion.

16. The oligomer-modified inorganic oxide fine particles according to claim 4, which have a unit viscosity in the range of 0.07 to 0.65 mPa·s/(wt %), the unit viscosity being obtained by dividing the viscosity of a methanol dispersion of the oligomer-modified inorganic oxide fine particles in methanol by the solid concentration of the aqueous dispersion.

17. The oligomer-modified inorganic oxide fine particles according to claim 2, wherein the weight (A) of oligomeric modifier has a ratio to the weight (B) of the inorganic oxide fine particles in the range of (A)/(B)=0.05 to 5.0.

18. The oligomer-modified inorganic oxide fine particles according to claim 3, wherein the weight (A) of oligomeric modifier has a ratio to the weight (B) of the inorganic oxide fine particles in the range of (A)/(B)=0.05 to 5.0.

19. The oligomer-modified inorganic oxide fine particles according to claim 4, wherein the weight (A) of oligomeric modifier has a ratio to the weight (B) of the inorganic oxide fine particles in the range of (A)/(B)=0.05 to 5.0.

* * * * *

UNITED STATES PATENT AND TRADEMARK OFFICE
CERTIFICATE OF CORRECTION

PATENT NO. : 9,534,122 B2
APPLICATION NO. : 14/366937
DATED : January 3, 2017
INVENTOR(S) : Yoichi Ishihara et al.

Page 1 of 1

It is certified that error appears in the above-identified patent and that said Letters Patent is hereby corrected as shown below:

On the Title Page

Column 1, Item (72) Inventors, Line 2, delete "Kitakyusyu" and insert -- Kitakyushu --

Signed and Sealed this
Ninth Day of May, 2017

Michelle K. Lee
*Director of the United States Patent and Trademark Office*